(12) United States Patent
Chandramowle et al.

(10) Patent No.: US 11,361,642 B2
(45) Date of Patent: Jun. 14, 2022

(54) BUILDING SYSTEM WITH SENSOR-BASED AUTOMATED CHECKOUT SYSTEM

(71) Applicant: Sensormatic Electronics, LLC, Boca Raton, FL (US)

(72) Inventors: Gopal Chandramowle, Boca Raton, FL (US); Amin Shahidi, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 17/231,595

(22) Filed: Apr. 15, 2021

(65) Prior Publication Data

US 2021/0327234 A1 Oct. 21, 2021

Related U.S. Application Data

(60) Provisional application No. 63/011,844, filed on Apr. 17, 2020.

(51) Int. Cl.
*G08B 13/24* (2006.01)
*H04B 17/318* (2015.01)
*G06V 40/16* (2022.01)

(52) U.S. Cl.
CPC ....... *G08B 13/2454* (2013.01); *G06V 40/168* (2022.01); *G06V 40/172* (2022.01); *G08B 13/2417* (2013.01); *G08B 13/2462* (2013.01); *H04B 17/318* (2015.01)

(58) Field of Classification Search
CPC .................................................. G08B 13/2454
See application file for complete search history.

(56) References Cited

U.S. PATENT DOCUMENTS

| | | | |
|---|---|---|---|
| 2015/0039458 A1* | 2/2015 | Reid | G06Q 20/206 705/26.1 |
| 2016/0019514 A1* | 1/2016 | Landers, Jr. | G07G 1/0045 705/23 |
| 2016/0078264 A1* | 3/2016 | Armstrong | G08B 13/2462 340/572.1 |
| 2019/0220844 A1* | 7/2019 | Trivelpiece | G06K 7/10029 |

OTHER PUBLICATIONS

International Search Report and Written Opinion for International Patent Application No. PCT/US2021/027738, dated Jul. 9, 2021 (93 pages).

* cited by examiner

*Primary Examiner* — Travis R Runnings
(74) *Attorney, Agent, or Firm* — ArentFox Schiff LLP

(57) ABSTRACT

Example aspects include a method, a system, and a non-transitory computer-readable medium for operating an automated checkout system to be performed by a processing circuit, comprising determining a user account associated with a shopper. The aspects further include receiving, from a sensor, a first indication that an object passed through a location of a building. The first indication having been generated based on a tag coupled with the object. The sensor being configured to detect characteristics of objects. The sensor being located at the location of the building. The aspects further include receiving, from the sensor, a second indication that the shopper associated with the user account passed through the location. Additionally, the aspects further include associating the object with the user account based on the first indication and the second indication.

20 Claims, 11 Drawing Sheets

BUILDING SYSTEM WITH SENSOR-BASED AUTOMATED CHECKOUT SYSTEM

CROSS-REFERENCE TO RELATED APPLICATIONS

This application claims the benefit of priority from U.S. Provisional Application No. 63/011,844 entitled "BUILDING SYSTEM WITH SENSOR-BASED AUTOMATED CHECKOUT SYSTEM" and filed on Apr. 17, 2020. The disclosures set forth in the referenced application are incorporated herein by reference in their entireties.

BACKGROUND

Technical Field

The present disclosure relates generally to Electronic Article Surveillance ("EAS"), and more particularly, to examples related to utilizing sensor networks of a retail management system to associate objects with user accounts of shoppers that exit commercial facilities with such objects.

INTRODUCTION

EAS systems are used to control inventory and to prevent or deter theft or unauthorized removal of articles from a controlled area. Such systems establish an electromagnetic field or "interrogation zone" that defines a surveillance zone (for example, entrances and/or exits in retail stores) encompassing the controlled area. The articles to be protected are tagged with an EAS security tag. Tags are designed to interact with the field in the interrogation zone, e.g., established by an EAS portal. The EAS portal includes one or more EAS readers (e.g., transmitter/receiver, antennas), and an EAS detection module/controller. The presence of a tag in the interrogation zone is detected by the system and appropriate action is taken. In most cases, the appropriate action includes the activation of an alarm.

A common practice in the retail industry may be to "source tag" articles with radio frequency identification ("RFID") tags, either at the time of packaging/manufacture, or at some other point in the supply chain. At the same time, EAS technology and devices have proven critical to the reduction of theft and so called "shrinkage." Since many articles arrive at the retailer with RFID tags, it is desirable that RFID tags be used also to provide EAS functionality in addition to their intended function of providing capabilities such as inventory control, shelf reading, non-line of sight reading, etc.

In some implementations, an RFID tag may be used to simulate EAS functionality by sending special codes when a reader interrogates the RFID tag. This arrangement advantageously eliminates the need for a separate EAS component, such as an acousto-magnetic ("AM") component, within the tag, or a separate EAS tag. Various schemes may be used to enable the use of RFID tags to simulate EAS functionality. In some such systems, the RFID tag indicates in some way that the item to which the tag is attached has been purchased at point of sale ("POS"). If the RFID tag is a detachable tag, the RFID tag may be simply detached at the point of sale. In such a system, the RFID readers at the exit would trigger an alarm if any tags are detected. In some such systems, data is written to the RFID chip at the POS to confirm the item was purchased. One common method is encoding a bit-flip at the POS, with the changed bit indicating that the item is authorized for removal. Other systems may read a unique ID from the tag, and store the unique ID in the enterprise system when the tagged item is purchased, so that the purchase may be verified by RFID readers as the tag exits the premises. If the purchase of the item cannot be verified based on tag data when the tag passes out of the store, an alarm may be triggered.

When shoppers purchase objects at brick-and-mortar retail stores, the shoppers often have to go through the process of picking up objects off of shelves and having such items scanned at cash registers before the shoppers are able to exit with the objects. During busy seasons such as the holidays, lines may build up at the cash registers as shoppers clamor to purchase various goods and objects. Current methods of stopping such lines from forming include self-scanning lines and express lines. Each of these solutions still require shoppers or cashiers to manually take out the objects for scanning and may cause additional lines to form. These lines may make the entire shopping experience take longer than it otherwise would and cause shoppers to avoid shopping in brick-and mortar retail stores altogether.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes an automated checkout system comprising a sensor configured to detect characteristics of objects. The sensor being located at a location of a building. The automated checkout system further comprises one or more processors, and one or more non-transitory memory devices storing computer-readable instructions that, when executed by the one or more processors, cause the one or more processors to determine a user account associated with a shopper. The computer-readable instructions further cause the cause the one or more processors to receive, from the sensor, a first indication that an object passed through the location. The first indication having been generated based on a tag coupled with the object. The computer-readable instructions further cause the cause the one or more processors to receive, from the sensor, a second indication that the shopper associated with the user account passed through the location. Additionally, the computer-readable instructions further cause the cause the one or more processors to associate the object with the user account based on the first indication and the second indication.

Another example aspect includes a method of operating an automated checkout system, comprising determining, by a processing circuit, a user account associated with a shopper. The method further comprises associating, by the processing circuit, the user account with a container. The method further comprises receiving, by the processing circuit from a sensor, a first indication that an object passed through a location of a building. The first indication having been generated based on a tag coupled with the object. The sensor having been configured to detect characteristics of objects and being located at the location of the building. The method further comprises receiving, by the processing circuit from the sensor, a second indication that the container passed through the location of the building. Additionally, the method further comprises associating, by the processing circuit, the object with the user account based on the first indication and the second indication.

Another example aspect includes a non-transitory computer-readable medium having computer-readable instructions stored thereon that, upon execution by a processor, cause the processor to perform operations comprising determining a user account associated with a shopper. The operations further comprise receiving, from a sensor, a first indication that the shopper passed through a location of a building and a second indication that an object passed through the location of the building. The second indication having been generated based on a tag coupled with the object. The operations further comprise determining a first time in which the object passed through the location of the building and a second time in which the shopper passed through the location of the building. Additionally, the operations further comprise associating the object with the user account based on the first time and the second time.

Another example aspect includes an automated checkout system comprising a first sensor configured to detect characteristics of objects. The first sensor being located at a location of a building. The automated checkout system further comprises one or more processors, and one or more non-transitory memory devices storing computer-readable instructions that, when executed by the one or more processors, cause the one or more processors to associate a user account with a container. The container having a second sensor configured to detect whether the objects have been added to the container or removed from the container. The computer-readable instructions further cause the one or more processors to receive, from the second sensor, a first indication that an object has been added to the container. The computer-readable instructions further cause the one or more processors to receive, from the first sensor, a second indication that the container passed through the location of the building. Additionally, the computer-readable instructions further cause the one or more processors to associate the object with the user account based on the second indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
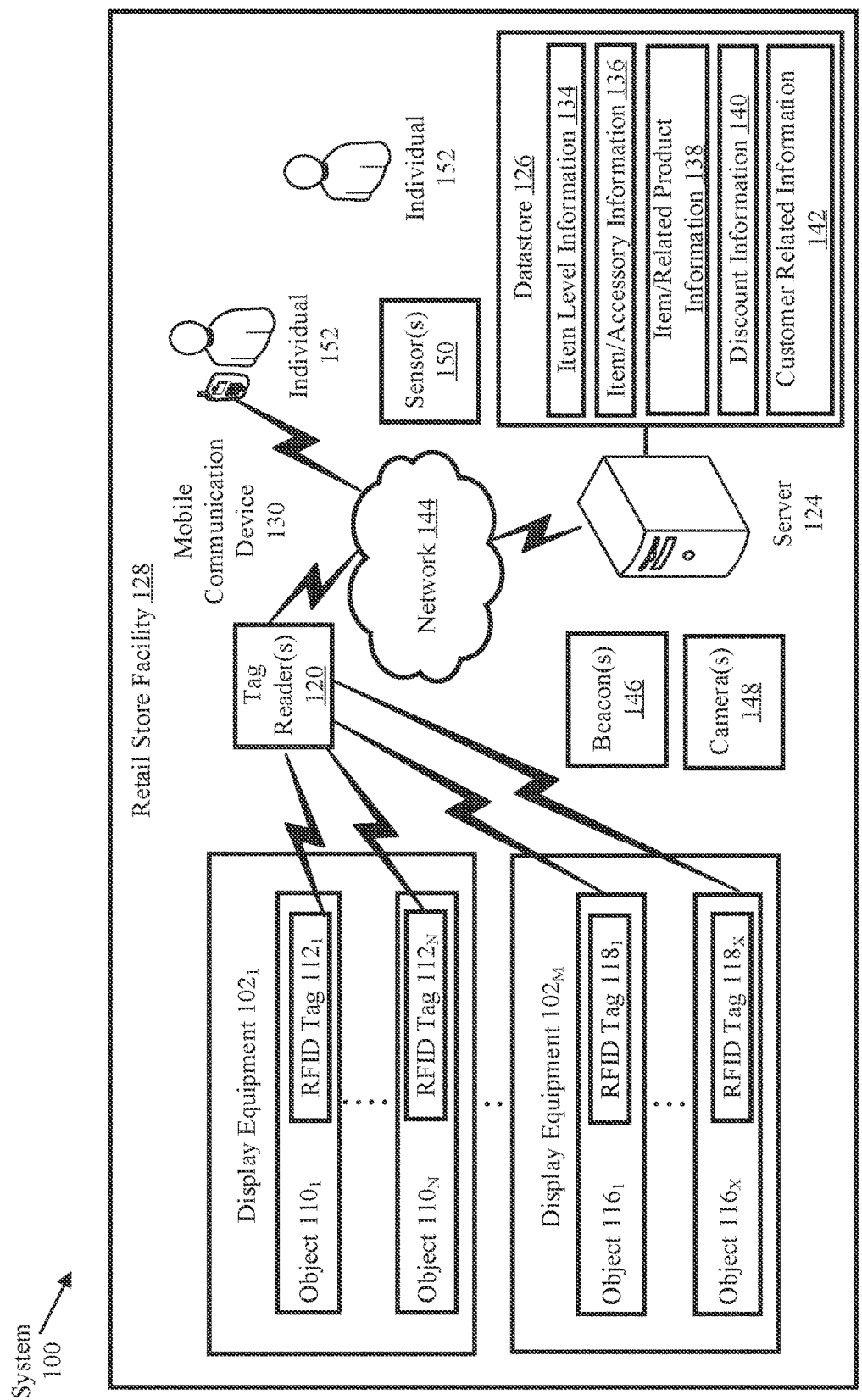
FIG. 1 is a diagram of an example architecture for a system, in accordance with various aspects of the present disclosure.

It will be readily understood that the components of the aspects as generally described herein and illustrated in the appended figures could be arranged and designed in a wide variety of different configurations. Thus, the following more detailed description of various aspects, as represented in the figures, is not intended to limit the scope of the present disclosure, but is merely representative of various aspects. While the various aspects of the aspects are presented in drawings, the drawings are not necessarily drawn to scale unless specifically indicated.

The present solution may be embodied in other specific forms without departing from its spirit or essential characteristics. The described aspects are to be considered in all respects only as illustrative and not restrictive. The scope of the present solution is indicated by the appended claims rather than by this detailed description. All changes that come within the meaning and range of equivalency of the claims are to be embraced within their scope.

Reference throughout this specification to features, advantages, or similar language does not imply that all of the features and advantages that may be realized with the present solution should be or are in any single aspect of the present solution. Rather, language referring to the features and advantages is understood to mean that a specific feature, advantage, or characteristic described in connection with an aspect is included in at least one aspect of the present solution. Thus, discussions of the features and advantages, and similar language, throughout the specification may, but do not necessarily, refer to the same aspect.

Furthermore, the described features, advantages, and characteristics of the present solution may be combined in any suitable manner in one or more aspects. One skilled in the relevant art will recognize, in light of the description herein, that the present solution may be practiced without one or more of the specific features or advantages of a particular aspect. In other instances, additional features and advantages may be recognized in certain aspects that may not be present in all aspects of the present solution.

Reference throughout this specification to "one aspect," "an aspect," or similar language means that a particular feature, structure, or characteristic described in connection with the indicated aspect is included in at least one aspect of the present solution. Thus, the phrases "in one aspect", "in an aspect," and similar language throughout this specification may, but do not necessarily, all refer to the same aspect.

As used in this document, the singular form "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

When shoppers go to retail stores to shop, the shoppers often have to go through the process of picking up objects off the shelves and having such items scanned at cash registers before they are able to exit the retail store with the objects. During busy seasons such as the holidays, lines may build up at the cash registers as shoppers clamor to purchase various goods and objects. The lines may be exacerbated when shoppers purchase a large number of objects that must each be individually scanned by humans. Conventional retail stores may attempt to reduce the likelihood of long lines by adding self-scanning checkout lines and/or express checkout lines. However, these solutions still require shoppers and/or cashiers to manually take out the objects for scanning, and, as such, may not prevent additional lines from forming. Conventional retail stores may have to implement such methods to track shopper purchases because the scanning codes on the items may not be immediately available upon checkout. For example, an object may be on the bottom of a pile of other objects with a scanning tag that is hidden from view. To scan the tag, a shopper must uncover the item and find the attached scanning tag. Because such situations may be common in retail stores, especially during seasons in which a large amount of items are purchased, large lines may form. These lines may make the entire shopping experience take longer than it otherwise would and cause shoppers to avoid shopping in brick-and-mortar stores altogether.

Examples of the technology disclosed herein provide for multiple manners for reducing the likelihood of long lines building up at cash registers. In some aspects, the use of the cash registers to scan and purchase objects from retail stores may be avoided. In other aspects, a retail management system may utilize sensors located at the entrance and/or exit of retail stores in combination with tags that are coupled with object within such retail stores to automatically determine when shoppers enter and/or exit the retail stores with such objects. The retail management system may charge the shoppers accordingly. Alternatively or additionally, an application may be downloaded to user devices of shoppers that keeps track of the shoppers' purchases. The retail management system may determine a user account (of the application) of a shopper from data such as visual data of the shopper and/or data received from a user device of the shopper that the retail management system receives when the shopper exits the retail store. One or more sensors at the entrance and/or exit may detect and/or generate such data. The sensors may also generate data based on scans of tags of objects that exits the retail store. The retail management may utilize the tags that are coupled with objects from the retail store to detect that the objects are exiting the retail store with the shopper. The retail management system may associate the objects, along with values associated with the objects, with the user account of the shopper upon detecting that the objects and/or the shopper have exited or are exiting the retail store.

Accordingly, by implementing the systems and methods described herein, a retail management system may enable shoppers to enter and exit a retail store without waiting in any lines at a cash register. In some aspects, the shoppers may enter the retail store, pick up an object, and exit with the object. Further, advantageously, the systems and methods described herein may be implemented using sensor network infrastructure that may have already been in place in retail stores for security purposes.

These and other features of the present disclosure are discussed in detail below with regard to FIGS. 1-11.

Referring now to FIG. 1, there is provided a schematic illustration of a system 100 that is useful for understanding the present solution. The present solution is described herein in relation to a retail store environment. The present solution is not limited in this regard, and may be used in other environments. For example, the present solution may be used in distribution centers, factories and other commercial environments. Notably, the present solution may be employed in any environment in which objects and/or items/articles need to be located and/or tracked.

The system 100 is generally configured to allow (a) improved inventory counts and surveillance of objects and/or items/articles located within a facility, and (b) improved customer experiences. As shown in FIG. 1, system 100 comprises a Retail Store Facility ("RSF") 128 in which display equipment $102_1$-$102_M$ is disposed. The display equipment is provided for displaying objects (or items/articles) $110_1$-$110_N$, $116_1$-$116_X$ to customers of the retail store. The display equipment may include, but is not limited to, shelves, article display cabinets, promotional displays, fixtures, and/or equipment securing areas of the RSF 128. The RSF 128 may also include emergency equipment (not shown), checkout counters, and other equipment and fixtures typical for the facility type.

At least one tag reader 120 is provided to assist in counting and tracking locations the articles $110_1$-$110_N$, $116_1$-$116_X$ within the RSF 128. The tag reader 120 comprises an RFID reader configured to read RFID tags. The tag reader 120 will be described in more detail below in relation to FIG. 3.

RFID tags $112_1$-$112_N$, $118_1$-$118_X$ (hereinafter "112," generally) are respectively attached or coupled with the articles $110_1$-$110_N$, $116_1$-$116_X$ (hereinafter "110," generally). This coupling may be achieved via an adhesive (e.g., glue, tape, or sticker), a mechanical coupler (e.g., straps, clamps, snaps, etc.), a weld, chemical bond, or other means. The RFID tags 112 may alternatively or additionally comprise dual-technology tags that have both EAS and RFID capabilities as described herein. The RFID tags 112 will be described in more detail below in relation to FIG. 2.

Notably, the tag reader 120 is strategically placed at a known location within the RSF 128, for example, at an exit/entrance. As such, the general location of articles 110 within the RSF 128 may be determined by correlating the tag reader's RFID tag reads and the tag reader's known location within the RSF 128. The tag reader's known coverage area also facilitates article 110 location determinations. Accordingly, RFID tag read information and tag reader 120 location information is stored in a datastore 126. This information may be stored in the datastore 126 using a server 124 and network 144 (e.g., an Intranet and/or Internet).

System 100 also comprises a Mobile Communication Device ("MCD") 130. MCD 130 includes, but is not limited to, a cell phone, a smart phone, a table computer, a personal digital assistant, and/or a wearable device (e.g., a smart watch). In accordance with some examples, the MCD 130 has a software application installed thereon that is operative to: facilitate the provision of various information 134-142 to the shopper 152; facilitate a purchase transaction; and/or facilitate the detachment of the RFID tags 112 from the articles 110; and/or facilitate the detachment of an anchored chain or cable from the articles 110.

The MCD 130 is generally configured to provide a visual and/or auditory output of item/article level information 134, accessory information 136, related product information 138, discount information 140, and/or customer related information 142. The item level information includes, but is not limited to, an item description, item nutritional information, a promotional message, an item regular price, an item sale price, a currency symbol, and/or a source of the item.

An accessory includes, but is not limited to, a useful auxiliary item that may be attached to or removed from an item/article (e.g., a drill bit or battery of a drill). The accessory information includes, but is not limited to, an accessory description, accessory nutritional information, a promotional message, an accessory regular price, an accessory sale price, a currency symbol, a source of the accessory, and/or an accessory location in the facility.

A related product includes, but is not limited to, a product/article that may be used in conjunction with or as an alternative to another product/article (e.g., diaper rash cream which may be used when changing a diaper, or a first diaper may be used as an alternative to another diaper). The related product information includes, but is not limited to, a related product description, related product nutritional information, a promotional message, a related product regular price, a related product sale price, a currency symbol, a source of the related product, and/or a related product location in the facility.

The discount information 140 may include, but is not limited to, a discount price for an article/product based on a loyalty level or other criteria. The customer related information 142 includes, but is not limited to, customer account numbers, customer identifiers, usernames, passwords, payment information, loyalty levels, historical purchase information, and/or activity trends.

The item level information 134, accessory information 136, related product information 138 and/or discount information 140 may be output in a format selected from a plurality of formats based on a geographic location of the item/article 110, a location of the MCD, a date, and/or an item pricing status (i.e., whether the item/article is on sale). In a display context, the format is defined by a font parameter, a color parameter, a brightness parameter, and/or a display blinking parameter. In an auditory context, the format is defined by a volume parameter, a voice tone parameter, and/or a male/female voice selected parameter.

The MCD 130 may also be configured to read barcodes and/or RFID tags 112. Information obtained from the barcode and/or RFID tag reads may be communicated from the MCD 130 to the server 124 via network 144. Similarly, the stored information 134-142 is provided from the server 124 to the MCD 130 via network 144. The network 144 includes an Intranet and/or the Internet.

Server 124 may be local to the facility 128 as shown in FIG. 1 or remote from the facility 128. Server 124 will be described in more detail below in relation to FIG. 4. Still, it should be understood that server 124 is configured to: write data to and read data from datastore 126, RFID tags 112, and/or MCD 130; perform language and currency conversion operations using item level information and/or accessory information obtained from the datastore, RFID tags 112, and/or MCD; perform data analytics based on inventory information, tag read information, MCD tracking information, and/or information 134-142; perform image processing using images captured by camera(s) 148; and/or determine locations of RFID tags 112 and/or MCDs in the RSF 128 using beacon(s) 146, tag reader 120 or other devices having known locations and/or antenna patterns.

In some examples, one or more beacons 146 transmitting an RF signal (second RF signal that is non-RFID) other than the RFID interrogation signal are placed to cover a zone of interest also covered by a tag reader 120 placed to cover an RFID interrogation zone, e.g., at a portal of the retail facility 128. The system 100 may detect and derive any number of relevant indicators based on second RF signal. The tag 112 response to the second RF signal is analyzed and compared to data collected by the RFID signal response that occurred concurrently with tag 112 passage through the portal.

The server 124 facilitates updates to the information 134-142 output from the MCD 130. Such information updating may be performed periodically, in response to instructions received from an associate (e.g., a retail store employee 132), in response to a detected change in the item level, accessory and/or related product information, in response to a detection that a shopper 152 is in proximity to an RFID tag 112, and/or in response to any motion or movement of the RFID tag 112. For example, if a certain product/article is placed on sale, then the sale price for that product/article is transmitted to MCD 130 via network 144 and/or RFID tag 112. The sale price is then output from the MCD 130. The present solution is not limited to the particulars of this example.

Although a single MCD 130 and/or a single server 124 are shown in FIG. 1, the present solution is not limited in this regard. It is contemplated that more than one computing device may be implemented. In addition, the present solution is not limited to the illustrative system architecture described in relation to FIG. 1.

During operation of system 100, the content displayed on the display screen of the MCD 130 is dynamically controlled based upon various tag 112 or item 110 related information and/or customer related information (e.g., mobile device identifier, mobile device 130 location in RSF 128, and/or customer loyalty level). The tag 112 or item level information includes, but is not limited to, first information indicating that an RFID tag 112 is in motion or that an article 110 is being handled by a shopper 152, second information indicating a current location of the RFID tag 112 and/or the MCD 130, third information indicating an accessory or related product of the article 110 with which the moving RFID tag 112 is coupled, and/or fourth information indicating the relative locations of the accessory and the moving RFID tag 112 and/or the relative locations of the related article 110 and the moving RFID tag 112. The first, second and fourth information may be derived based on sensor data generated by sensors local to the RFID tag 112. Accordingly, the RFID tags 112 include one or more sensors to detect their current locations, detect any shopper in proximity thereto, and/or detect any motion or movement thereof. The sensors include, but are not limited to, an Inertial Measurement Unit ("IMU"), a vibration sensor, a light sensor, an accelerometer, a gyroscope, a proximity sensor, a microphone, and/or a beacon communication device. The third information may be stored local to the RFID tags 112 or in a remote datastore 126 as information 136, 138.

In some scenarios, the MCD 130 facilitates the server's 124 (a) detection of when the shopper 152 enters the RSF 128, (b) tracking of the shopper's movement through the RSF, (c) detection of when the shopper 152 is in proximity to an article 110 with which an RFID tag 112 is coupled, (d) determination that an RFID tag 112 is being handled or moved by the shopper 152 based on a time stamped pattern of MCD movement and a timestamped pattern of RFID tag 112 movement, and/or (e) determination of an association of moving RFID tags 112 and the shopper 152.

When a detection is made that an RFID tag 112 is being moved, the server 124 may, in some scenarios, obtain customer related information (such as a loyalty level) 142 associated with the shopper 152. This information may be obtained from the shopper's MCD 130 and/or the datastore 126. The customer related information 142 is then used to retrieve discount information 140 for the article 110 with which the RFID tag 112 is coupled. The retrieved discount information is then communicated from the server 124 to the shopper's MCD 130. The shopper's MCD 130 may output the discount information in a visual format and/or an auditory format. Other information may also be communicated from the server 124 to the shopper's MCD 130. The other information includes, but is not limited to, item level information, accessory information, and/or related product information.

In those or other scenarios, a sensor embedded in the RFID tag 112 detects when a shopper is handling the article 110 with which the RFID tag 112 is coupled. When such a detection is made, the RFID tag 112 retrieves the object's unique identifier from its local memory, and wirelessly communicates the same to the tag reader 120. The tag reader 120 then passes the information to the server 124. The server 124 uses the object's unique identifier and the item/accessory relationship information (e.g., table) 136 to determine if there are any accessories associated therewith. If no accessories exist for the article 110, the server 124 uses the item level information 134 to determine one or more characteristics of the article 110. For example, the article 110 includes a product of a specific brand. The server 124 then uses the item/related product information (e.g., table) 138 to identify: other products of the same type with the same characteristics; and/or other products that are typically used in conjunction with the object. Related product information for the identified related products is then retrieved and provided to the MCD 130. The MCD 130 may output the related product information in a visual format and/or an auditory format. The shopper 152 may perform user-software interactions with the MCD 130 to obtain further information obtain the related product of interest. The present solution is not limited to the particulars of this scenario.

Retail store facility 128 may also include sensors 150, such as video sensors, audio sensors, thermal sensors, infrared sensors, people counters, and radar sensors.

Figure 2:
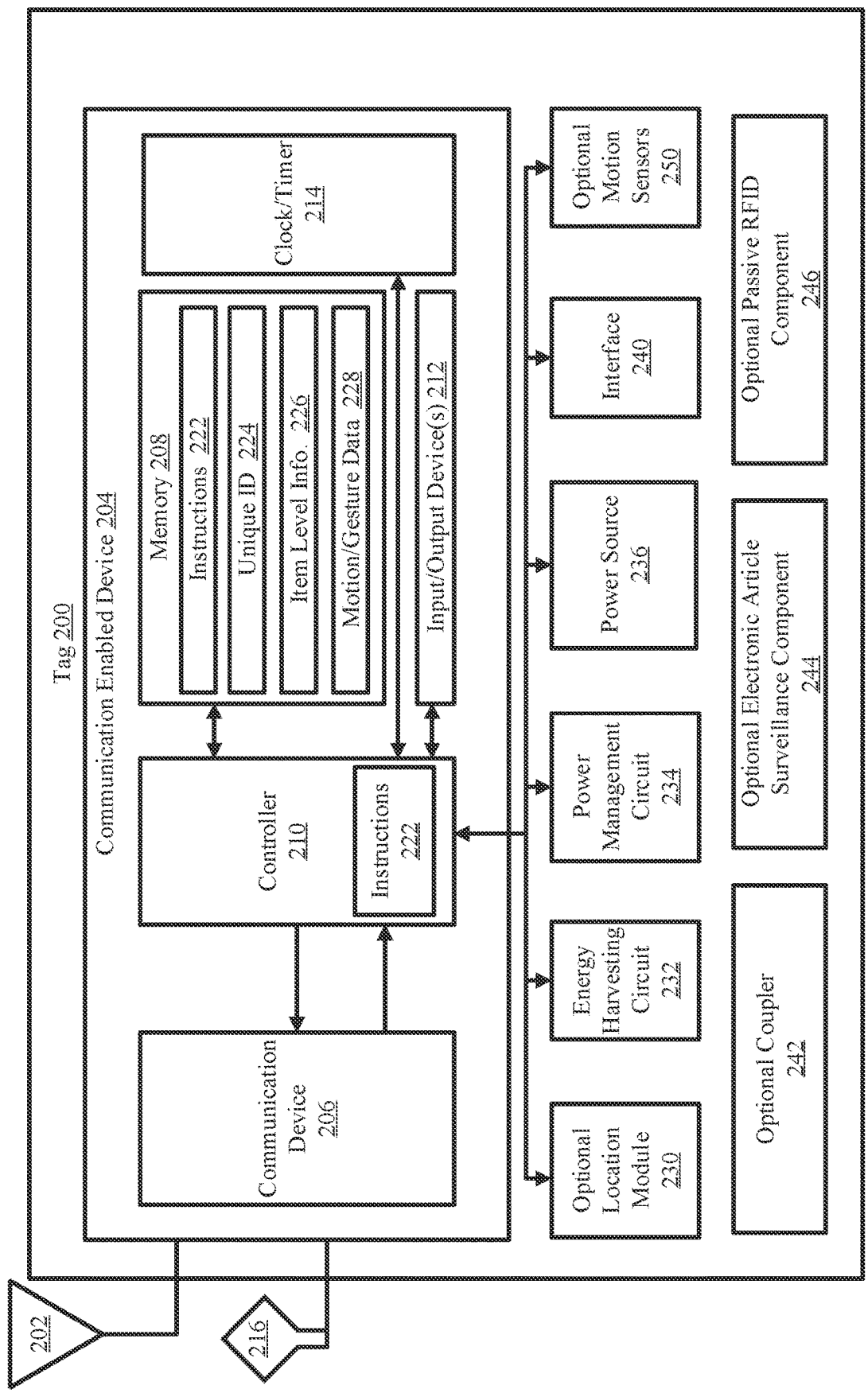
FIG. 2 is a diagram of an example architecture for a tag, in accordance with various aspects of the present disclosure.

Referring now to FIG. 2, there is an illustration of an illustrative architecture for a tag 200. RFID tags $112_1$-$112_N$, $118_1$-$118_X$ are the same as or similar to tag 200. As such, the discussion of tag 200 is sufficient for understanding the RFID tags $112_1$-$112_N$, $118_1$-$118_X$ of FIG. 1. Tag 200 is generally configured to perform operations to (a) minimize power usage so as to extend a power source's life (e.g., a battery or a capacitor), (b) minimize collisions with other tags so that the tag of interest may be seen at given times, (c) optimize useful information within an inventory system (e.g., communicate useful change information to a tag reader), and/or (d) optimize local feature functions.

The tag 200 may include more or less components than those shown in FIG. 2. However, the components shown are sufficient to disclose an illustrative aspect implementing the present solution. Some or all of the components of the tag 200 may be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative tag 200 configured to facilitate improved inventory management/surveillance and customer experience. In this regard, the tag 200 is configured for allowing data to be exchanged with an external device (e.g., a tag reader 120 of FIG. 1, a beacon 146 of FIG. 1, an MCD 130 of FIG. 1, and/or a server 124 of FIG. 1) via wireless communication technology. The wireless communication technology may include, but is not limited to, a RFID technology, a Near Field Communication ("NFC") technology, and/or a Short Range Communication ("SRC") technology. For example, one or more of the following wireless communication technologies are employed: Radio Frequency ("RF") communication technology; Bluetooth technology (including Bluetooth Low Energy ("BLE")); Wireless Fidelity ("WiFi") technology; beacon technology; and/or Light Fidelity ("LiFi") technology. Any known or to be known wireless communication technology or other wireless communication technology may be used herein without limitation.

The components 206-214 shown in FIG. 2 may be collectively referred to herein as a communication enabled device 204, and may include a memory 208 and a clock/timer 214. Memory 208 may be a volatile memory and/or a non-volatile memory. For example, the memory 208 may include, but is not limited to, Random Access Memory ("RAM"), Dynamic RAM ("DRAM"), Static RAM ("SRAM"), Read Only Memory ("ROM"), and flash memory. The memory 208 may also comprise unsecure memory and/or secure memory.

In some scenarios, the communication enabled device 204 comprises a Software Defined Radio ("SDR", not shown). The SDR may be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 208. Notably, the communication protocols may be downloaded to the device at any given time. The initial/default role (being an RFID, WiFi, LiFi, etc. tag) may be assigned at the deployment thereof. If the user desires to use another protocol later, the user may remotely change the communication protocol of the deployed tag 200. The update of the firmware, in case of issues, may also be performed remotely.

As shown in FIG. 2, the communication enabled device 204 comprises at least one antenna 202, 216 for allowing data to be exchanged with the external device via a wireless communication technology (e.g., an RFID technology, an NFC technology, a SRC technology, and/or a beacon technology). The antenna 202, 216 is configured to receive signals from the external device and/or transmit signals generated by the communication enabled device 204. The antenna 202, 216 may comprise a near-field or far-field antenna. The antenna 202, 216 include, but are not limited to, a chip antenna or a loop antenna.

The communication enabled device 204 also comprises a communication device (e.g., a transceiver or transmitter) 206. The communication device 206 may generate and transmit signals (e.g., RF carrier signals) to external devices, as well as receive signals (e.g., RF signals) transmitted from external devices. In this way, the communication enabled device 204 facilitates the registration, identification, and location and/or tracking of an item (e.g., article 110 or 112 of FIG. 1) with which the tag 200 is coupled.

The communication enabled device 204 may be configured to: communicate (transmit and/or receive) in accordance with a time slot communication scheme; and selectively enable/disable/bypass the communication device (e.g., transceiver) or at least one communications operation based on output of a motion sensor 250. In some scenarios, the communication enabled device 204 selects: one or more time slots from a plurality of time slots based on the tag's unique identifier 224 (e.g., an Electronic Product Code ("EPC")); and/or determines a Window Of Time ("WOT") during which the communication device (e.g., transceiver) 206 is to be turned on or at least one communications operation is be enabled subsequent to when motion is detected by the motion sensor 250. The WOT may be determined based on environmental conditions (e.g., humidity, temperature, time of day, relative distance to a location device (e.g., beacon or location tag), etc.) and/or system conditions (e.g., amount of traffic, interference occurrences, etc.). In this regard, the tag 200 may include additional sensors not shown in FIG. 2.

The communication enabled device 204 also facilitates the automatic and dynamic modification of item level information 226 that is being or is to be output from the tag 200 in response to certain trigger events. The trigger events may include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the tag 200 may be stored in memory 208 of the communication enabled device 204 and/or communicated to other external devices (e.g., tag reader 120 of FIG. 1 or tag reader 300 of FIG. 3 described below, beacon 146 of FIG. 1, MCD 130 of FIG. 1, and/or server 124 of FIG. 1) via communication device (e.g., transceiver) 206 and/or interface 240 (e.g., an Internet Protocol or cellular network interface). For example, the communication enabled device 204 may communicate information specifying a timestamp, a unique identifier for an item/article 110, item description, item price, a currency symbol and/or location information to an external device. The external device (e.g., server 124, server 400 described below, or MCD 130) may then store the information in a database (e.g., database 126 of FIG. 1) and/or use the information for various purposes.

The communication enabled device 204 also comprises a controller 210 (e.g., a CPU) and input/output devices 212. The controller 210 may execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 may also reside, completely or at least partially, within the controller 210 during execution thereof by the tag 200. The memory 208 and the controller 210 also may constitute machine-readable media. The term "machine-readable media," as used here, refers to a single medium or multiple media (e.g., a centralized or distributed database, and/or associated caches and servers) that store the one or more sets of instructions 222. The term "machine-readable media," as used here, also refers to any medium that is capable of storing, encoding, or carrying a set of instructions 222 for execution by the tag 200 and that cause the tag 200 to perform any one or more of the methodologies of the present disclosure.

The input/output devices 212 may include, but are not limited to, a display (e.g., an E Ink display, an LCD display, and/or an active matrix display), a speaker, a keypad, and/or light emitting diodes. The display may be used to present item level information in a textual format and/or graphical format. Similarly, the speaker may be used to output item level information in an auditory format. The speaker and/or light emitting diodes may be used to output alerts for drawing a person's attention to the tag 200 (e.g., when motion thereof has been detected) and/or for notifying the person of a particular pricing status (e.g., on sale status) of the item/article 110 with which the tag is coupled.

The clock/timer 214 is configured to determine a date, a time, and/or an expiration of a pre-defined period of time. Any known or to be known technique for determining these listed items may be used herein without limitation.

The tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic location may be used herein without limitation including relative positioning within a facility or structure.

The optional coupler 242 is provided to couple the tag 200 securely or removably to an item (e.g., object 110 or 112 of FIG. 1). The coupler 242 includes, but is not limited to, a mechanical coupling means (e.g., a strap, clip, clamp, snap) and/or adhesive (e.g., glue or sticker). The coupler 242 is optional since the coupling may be achieved via a weld and/or chemical bond.

The tag 200 may also include a power source 236, an optional EAS component 244, and/or a passive/active/semi-passive RFID component 246. Any known or to be known battery, EAS component and/or RFID component may be used herein without limitation. The power source 236 may include, but is not limited to, a rechargeable battery and/or a capacitor.

As shown in FIG. 2, the tag 200 further comprises an energy harvesting circuit 232 and a power management circuit 234 for ensuring continuous operation of the tag 200 without the need to change the rechargeable power source (e.g., a battery). In some scenarios, the energy harvesting circuit 232 is configured to harvest energy from one or more sources (e.g., heat, light, vibration, magnetic field, and/or RF energy) and to generate a relatively low amount of output power from the harvested energy. By employing multiple sources for harvesting, the tag 200 may continue to charge despite the depletion of a source of energy. Any known or to be known energy harvesting circuit 232 may be used herein without limitation.

As noted above, the tag 200 may also include a motion sensor 250. Any known or to be known motion sensor may be used herein without limitation. For example, the motion sensor 250 includes, but is not limited to, a vibration sensor, an accelerometer, a gyroscope, a linear motion sensor, a Passive Infrared ("PIR") sensor, a tilt sensor, and/or a rotation sensor.

The motion sensor 250 is communicatively coupled with the controller 210 such that the motion sensor 250 may notify the controller 210 when tag motion is detected. The motion sensor 250 also communicates sensor data to the controller 210. The sensor data is processed by the controller 210 to determine whether the motion is of a type for triggering enablement of the communication device (e.g., transceiver) 206 or at least one communications operation. For example, the sensor data may be compared to stored motion/gesture data 228 to determine if a match exists there-between. More specifically, a motion/gesture pattern specified by the sensor data may be compared to a plurality of motion/gesture patterns specified by the stored motion/gesture data 228. The plurality of motion/gesture patterns may include, but are not limited to, a motion pattern for walking, a motion pattern for running, a motion pattern for vehicle transport, a motion pattern for vibration caused by equipment or machinery in proximity to the tag (e.g., an air conditioner or fan), a gesture for requesting assistance, a gesture for obtaining additional product information, and/or a gesture for product purchase. The type of movement (e.g., vibration or being carried) is then determined based on which stored motion/gesture data matches the sensor data. This feature allows the tag 200 to selectively enable the communication device (e.g., transceiver) or at least one communications operation only when the tag's location within a facility is actually being changed (e.g., and not when a fan is causing the tag to simply vibrate).

In some scenarios, the tag 200 may be also configured to enter a sleep state in which at least the motion sensor triggering of communication operations is disabled. This is desirable, for example, in scenarios when the tag 200 is being shipped or transported from a distributor to a customer. In those or other scenarios, the tag 200 may be further configured to enter the sleep state in response to its continuous detection of motion for a given period of time. The tag 200 transition from a sleep state in response to expiration of a defined time period, tag 200 reception of a control signal from an external device, and/or tag 200 detection of no motion for a period of time.

The power management circuit 234 is generally configured to control the supply of power to components of the tag 200. In the event all of the storage and harvesting resources deplete to a point where the tag 200 is about to enter a shutdown/brownout state, the power management circuit 234 may cause an alert to be sent from the tag 200 to a remote device (e.g., tag reader 120 or server 124 of FIG. 1). In response to the alert, the remote device may inform an associate (e.g., a store employee 132 of FIG. 1) so that (s)he may investigate why the tag 200 is not recharging and/or holding charge.

The power management circuit 234 is also capable of redirecting an energy source to the tag 200 electronics based on the energy source's status. For example, if harvested energy is sufficient to run the tag 200 functions, the power management circuit 234 confirms that all of the tag 200 storage sources are fully charged such that the tag 200 electronic components may be run directly from the harvested energy. This ensures that the tag 200 has stored energy in case harvesting source(s) disappear or lesser energy is harvested for reasons such as drop in RF, light or vibration power levels. If a sudden drop in any of the energy sources is detected, the power management circuit 234 may cause an alert condition to be sent from the tag 200 to the remote device (e.g., tag reader 120 or server 124 of FIG. 1). At this point, an investigation may be required as to what caused this alarm. Accordingly, the remote device may inform the associate (e.g., a store employee 132 of FIG. 1) so that (s)he may investigate the issue. For example, other merchandise may be obscuring the harvesting source or the tagged article 110 may be being stolen.

The present solution is not limited to that shown in FIG. 2. The tag 200 may have any architecture provided that the tag 200 may perform the functions and operations described herein. For example, all of the components shown in FIG. 2 may comprise a single device (e.g., an Integrated Circuit ("IC")). Alternatively, some of the components may comprise a first tag element (e.g., a Commercial Off The Shelf ("COTS") tag) while the remaining components comprise a second tag element communicatively coupled with the first tag element. The second tag element may provide auxiliary functions (e.g., motion sensing, etc.) to the first tag element. The second tag element may also control operational states of the first tag element. For example, the second tag element may selectively (a) enable and disable one or more features/operations of the first tag element (e.g., transceiver operations), (b) couple or decouple an antenna to and from the first tag element, (c) bypass at least one communications device or operation, and/or (d) cause an operational state of the first tag element to be changed (e.g., cause transitioning the first tag element between a power save mode and non-power save mode). In some scenarios, the operational state change may be achieved by changing the binary value of at least one state bit (e.g., from 0 to 1, or vice versa) for causing certain communication control operations to be performed by the tag 200. Additionally or alternatively, a switch may be actuated for creating a closed or open circuit. The present solution is not limited in this regard.

Figure 3:
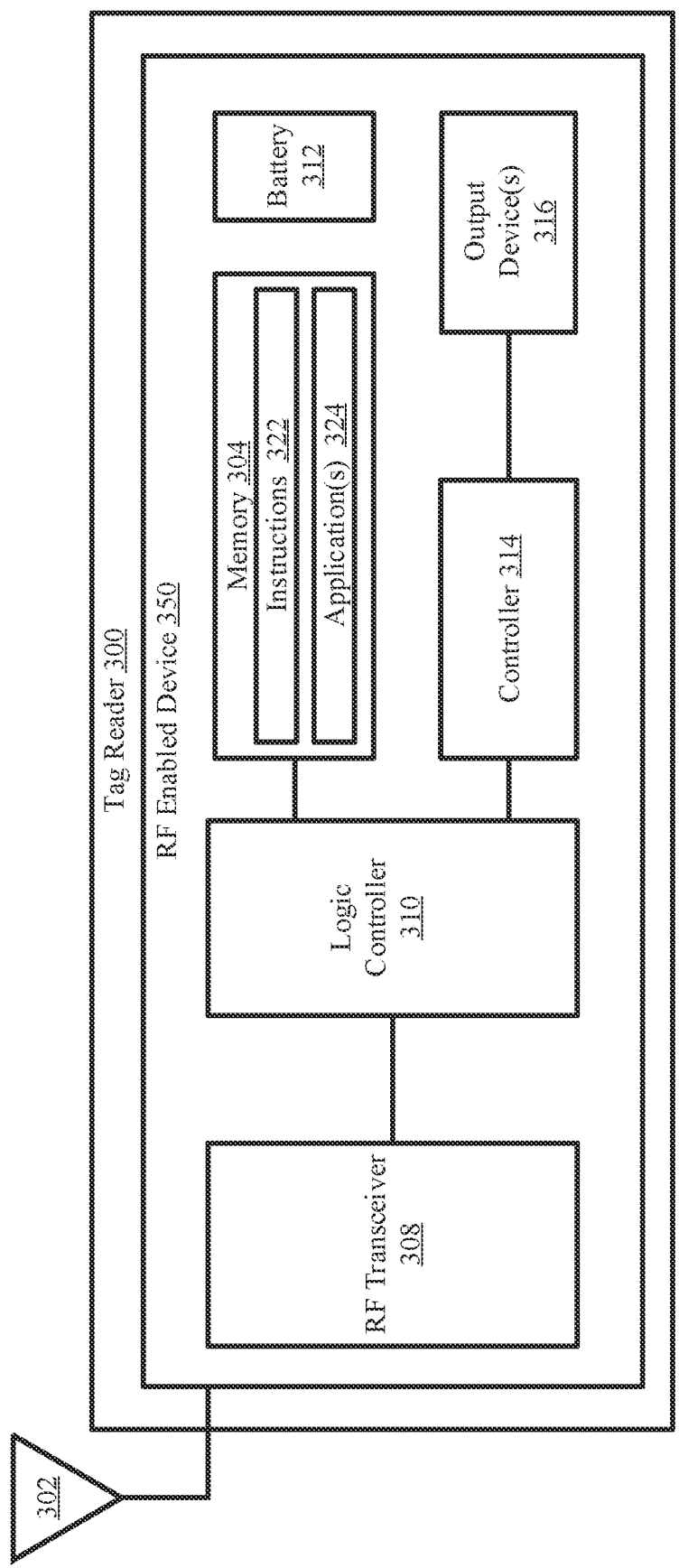
FIG. 3 is a diagram of an example architecture for a tag reader, in accordance with various aspects of the present disclosure.

Referring now to FIG. 3, there is provided a detailed block diagram of an exemplary architecture for a tag reader 300. Tag reader 120 of FIG. 1 is the same as or similar to tag reader 300. As such, the discussion of tag reader 300 is sufficient for understanding tag reader 120.

Tag reader 300 may include more or less components than that shown in FIG. 3. However, the components shown are sufficient to disclose an illustrative aspect implementing the present solution. Some or all of the components of the tag reader 300 may be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an illustration of a representative tag reader 300 configured to facilitate improved inventory counts and management within an RSF (e.g., RSF 128 of FIG. 1). In this regard, the tag reader 300 comprises an RF enabled device 350 for allowing data to be exchanged with an external device (e.g., RFID tags $112_1$-$112_N$, $118_1$-$118_X$ of FIG. 1) via RF technology. The components 304-316 shown in FIG. 3 may be collectively referred to herein as the RF enabled device 350, and may include a power source 312 (e.g., a battery) or be connected to an external power source (e.g., an AC mains).

The RF enabled device 350 comprises one or more antennas 302 for allowing data to be exchanged with the external device via RF technology (e.g., RFID technology or other RF based technology). The external device may comprise RFID tags $112_1$-$112_N$, $118_1$-$118_X$ of FIG. 1. In this case, the antenna 302 is configured to transmit RF carrier signals (e.g., interrogation signals) to the listed external devices, and/or transmit data response signals (e.g., authentication reply signals or an RFID response signal) generated by the RF enabled device 350. In this regard, the RF enabled device 350 comprises an RF transceiver 308. The RF transceiver 308 may receive RF signals including information from the transmitting device, and may forward the same to a logic controller 310 for extracting the information therefrom.

The extracted information may be used to determine the presence, location, and/or type of movement of an RFID tag within a facility (e.g., RSF 128 of FIG. 1). Accordingly, the logic controller 310 may store the extracted information in memory 304, and execute algorithms using the extracted information. For example, the logic controller 310 may correlate tag reads with beacon reads to determine the location of the RFID tags within the facility. The logic controller 310 may also perform pattern recognition operations using sensor data received from RFID tags and comparison operations between recognized patterns and pre-stored patterns. The logic controller 310 may further select a time slot from a plurality of time slots based on a tag's unique identifier (e.g., an EPC), and communicate information specifying the selected time slot to the respective RFID tag. The logic controller 310 may additionally determine a WOT during which a given RFID tag's communication device (e.g., transceiver) or operation(s) is(are) to be turned on when motion is detected thereby, and communicate the same to the given RFID tag 200. The WOT may be determined based on environmental conditions (e.g., temperature, time of day, etc.) and/or system conditions (e.g., amount of traffic, interference occurrences, etc.). Other operations performed by the logic controller 310 will be apparent from the following discussion.

Notably, memory 304 may be a volatile memory and/or a non-volatile memory. For example, the memory 304 may include, but is not limited to, a RAM, a DRAM, an SRAM, a ROM, and a flash memory. The memory 304 may also comprise unsecure memory and/or secure memory. The phrase "unsecure memory," as used herein, refers to memory configured to store data in a plain text form. The phrase "secure memory," as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to whether or not RFID tags 200 are present within a facility 128, where the RFID tags 200 are located within a facility 128, which RFID tags 200 are in motion at any given time. Other functions of the RF enabled device 350 will become apparent as the discussion progresses.

Figure 4:
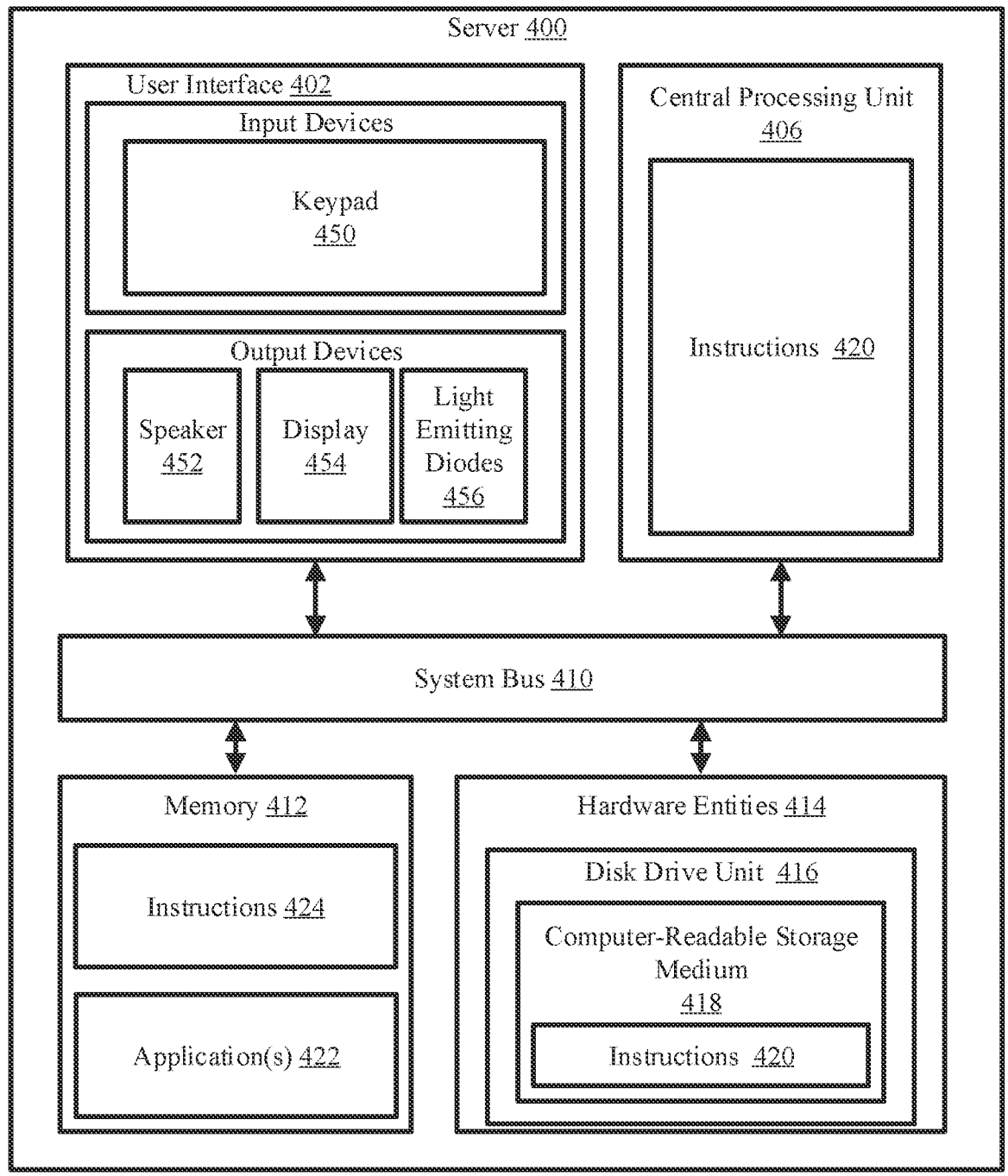
FIG. 4 is a diagram of an example architecture for a server, in accordance with various aspects of the present disclosure.

Referring now to FIG. 4, there is provided a detailed block diagram of an exemplary architecture for a server 400. Server 124 of FIG. 1 is the same as or substantially similar to server 400. As such, the following discussion of server 400 is sufficient for understanding server 124.

Notably, the server 400 may include more or less components than those shown in FIG. 4. However, the components shown are sufficient to disclose an illustrative aspect implementing the present solution. The hardware architecture of FIG. 4 represents one aspect of a representative server configured to facilitate inventory counts, inventory management, and improved customer experiences.

Some or all the components of the server 400 may be implemented as hardware, software and/or a combination of hardware and software. The hardware includes, but is not limited to, one or more electronic circuits. The electronic circuits may include, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 4, the server 400 comprises a user interface 402, a CPU 406, a system bus 410, a memory 412 connected to and accessible by other portions of server 400 through system bus 410, and hardware entities 414 connected to system bus 410. The user interface may include input devices (e.g., a keypad 450) and output devices (e.g., speaker 452, a display 454, and/or light emitting diodes 456), which facilitate user-software interactions for controlling operations of the server 400.

At least some of the hardware entities 414 perform actions involving access to and use of memory 412, which may be a RAM, a disk driver, and/or a Compact Disc Read Only Memory ("CD-ROM"). Hardware entities 414 may include a disk drive unit 416 comprising a computer-readable storage medium 418 on which is stored one or more sets of instructions 420 (e.g., software code) configured to implement one or more of the methodologies, procedures, or functions described herein. The instructions 420 may also reside, completely or at least partially, within the memory 412 and/or within the CPU 406 during execution thereof by the server 400. The memory 412 and the CPU 406 also may constitute machine-readable media. The term "machine-readable media," as used here, refers to a single medium or multiple media (e.g., a centralized or distributed database, and/or associated caches and servers) that store the one or more sets of instructions 420. The term "machine-readable media," as used here, also refers to any medium that is capable of storing, encoding, or carrying a set of instructions 420 for execution by the server 400 and that cause the server 400 to perform any one or more of the methodologies of the present disclosure. The computer-readable medium (also referred to as computer-readable media) includes a computer storage medium which may be referred to as non-transitory computer-readable medium. A non-transitory computer-readable medium may exclude transitory signals.

In some scenarios, the hardware entities 414 include an electronic circuit (e.g., a processor) programmed for facilitating the provision of a three-dimensional map showing locations of RFID tags 200 within a facility and/or changes to said locations in near real-time. In this regard, it should be understood that the electronic circuit may access and run a software application 422 installed on the server 400. The software application 422 is generally operative to facilitate the determination of RFID tag 200 locations within a facility, the direction of travel of RFID tags 200 in motion, and the mapping of the RFID tag 200 locations and movements in a virtual three-dimensional space.

In those or other scenarios, the hardware entities 414 include an electronic circuit (e.g., a processor) programmed for facilitating item/article inventorying, merchandise sale, and/or customer satisfaction with a shopping experience. In this regard, the electronic circuit may access and run an inventorying software application 422 and an MCD display software application 422 installed on the server 400. The software applications 422 are collectively generally operative to: obtain item level information and/or other information from MCDs and RFID tags 200; program item level information, accessory information, related product information and/or discount information onto RFID tags 200 and/or MCDs; convert the language, pricing and/or currency symbol of item level information, accessory information, related product information and/or discount information; facilitate registration of RFID tags 200 and MCDs with an enterprise system; and/or determine when MCD display update actions need to be taken based on RFID tag 200 information. Other functions of the software applications 422 will become apparent as the discussion progresses. Such other functions may relate to tag reader control and/or tag control.

Figure 5:
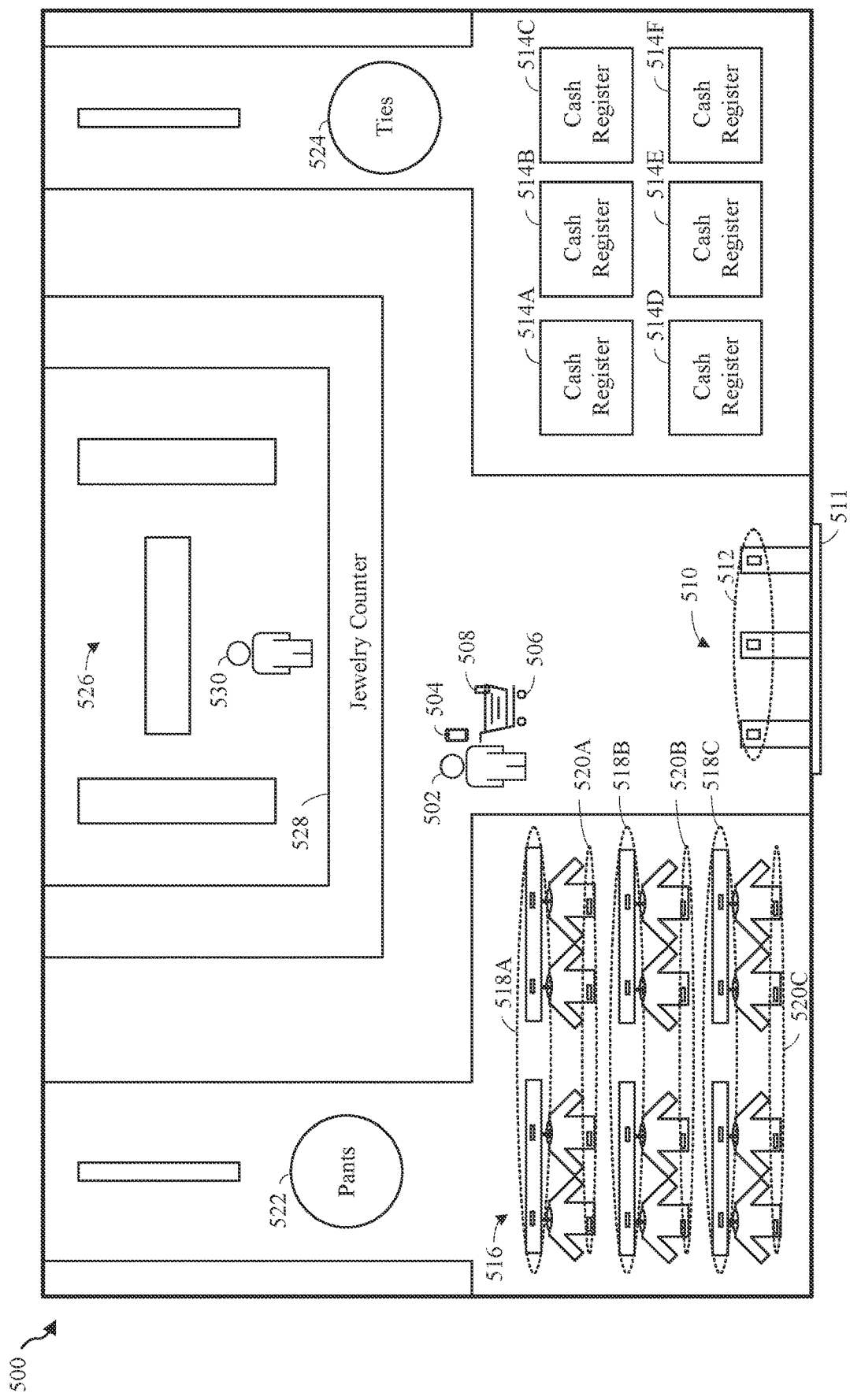
FIG. 5 is a diagram of an example environment for a system, in accordance with various aspects of the present disclosure.

Referring now to FIG. 5, a retail environment 500 in which the systems and methods of the present disclosure may be implemented is shown, according to an exemplary embodiment. The retail environment 500 may be part of a retail store that shoppers may visit to purchase various objects, such as the RSF 128 described above in connection with FIG. 1. The retail environment 500 may be served by a retail management system ("RMS"), such as RMS 602 described in detail below in connection with FIG. 6. An RMS may be, in general, a system of devices configured to control, monitor, and manage operation of devices in a retail environment. An RMS may include, for example, a heating, ventilation, and air conditioning ("HVAC") system, a security system, a sensor system, a lighting system, a fire alerting system, and/or any other system that is capable of managing retail environment functions or devices, or any combination thereof.

The retail environment 500 may include a shopper 502, a user device 504, a container 506, security posts 510, an exit door 511, exit sensors 512, cash registers 514A-514F, clothes racks 516, pants 522, ties 524, a jewelry area 526, a jewelry counter 528, and/or a jewelry salesman 530. The retail environment 500 is intended to be an example environment in which the systems and methods of the present disclosure may be implemented. The retail environment 500 may include any objects or items that are typically included in retail stores. For example, the shopper 502 may be a person that has entered the retail environment 500 (e.g., a customer, a client) to purchase various objects. An application being executed by the user device 504 may be configured to transmit a signal (e.g., a Bluetooth signal) to a Bluetooth beacon or an access point upon entering the range of the Bluetooth beacon or access point. The signal may indicate that the user device 504 has entered the retail environment 500. Alternatively or additionally, the signal may indicate that the shopper 502 has entered the retail environment 500 based at least on the shopper 502 being associated with the user device 504. For example, the signal may include a device identifier that is individually associated with the user device 504 and/or with the application being executed by the user device 504. The Bluetooth beacon or access point may receive the signal and transmit the signal to a processor of the RMS. The processor may identify the user (e.g., shopper 502) and/or the user device 504 from the device identifier by comparing the device identifier to a database. Accordingly, the RMS may automatically determine when a shopper 502 enters and/or exits the retail environment 500 based on the signals from the user device 504.

The container 506 may comprise a device and/or apparatus configured to hold and/or carry objects that the shopper 502 intends to purchase. In some aspects, the container 506 may comprise a container that is temporarily provided to the shopper 502 during the transaction, such as a shopping cart, a basket, a trolley, and the like. The shopper 502 may have to return possession of such containers 506 to the retail environment 500 prior to exiting the premises. In other aspects, the contain 506 may comprise a container that is permanently provided to the shopper 502 (e.g., sold to the shopper 502) and/or that is provided by the shopper 502 (e.g., previously owned by the shopper 502), such as a shopping bag, a box, a tote bag, and the like. In these aspects, the shopper 502 may not have to return possession of the container 506 prior to existing the premises. Alternatively or additionally, the shopper 502 may hold or push the container 506 as the shopper 502 travels around the retail environment 500 picking up objects for purchase. The shopper 502 may pick up objects such as pants 522 and/or ties 524 and add them to the container 506. Other objects that shopper 502 may purchase may be stored in the jewelry counter 528. For example, the jewelry salesman 530 may provide a jewelry selection to the shopper 502.

In some aspects, a container sensor 508 may be coupled with the container 506. The container sensor 508 may detect when objects are added to the container 506 as the shopper 502 adds the objects to the container 506. In other aspects, the container 506 may not have the container sensor 508. Alternatively or additionally, the container 506 may also be coupled with a tag (e.g., an RFID tag). The exit sensors 512 may detect the tag when the shopper 502 exits the retail environment 500 with the container 506.

Other items that the shopper 502 may purchase or otherwise add to the container 506 may be clothes from the clothes racks 516. The clothes may be coupled with tags 520A-520C. The tags 520A-520C (herein "520", generally) may be RFID tags, electro-magnetic tags, acousto-magnetic tags, magnetic tags, pictures (e.g., one, two, and three-dimensional barcodes or any other individually identifiable picture), Bluetooth tracking tags, or any other tag that may be detected by a scanner or a sensor. The tags 520 depicted in FIG. 5 may be similar in many respects to the RFID tags $112_1$-$112_N$, $118_1$-$118_X$ of FIG. 1 and to the tag 200 of FIG. 2, and may include additional features not mentioned above. The tags 520 may be individually associated with clothes with which the tags 520 are coupled. In some aspects, the tags 520 may be coupled with the objects so the shopper 502 may take them off without relying on assistance from a store employee within the retail environment 500. For example, the tags 520 may be in the form of a sticker or a small clip that may be cut off. The shopper 502 may add the clothes from the clothes racks 516 to the container 506, and the container sensor 508 of the container 506 may detect the clothes that have been added to the container 506 by identifying the tags 520 coupled with the added clothes. Similar tags may be on any objects in the retail environment 500.

The clothes racks 516 may include or be coupled with sensors 518A-518C (herein "518", generally) which may detect when clothes have been added or removed from a clothes rack. The sensors 518 may detect when clothes have been added or removed from the clothes rack by detecting the tags 520 that are coupled with the clothes. The sensors 518 may transmit indications of the detected clothes to the RMS to keep a count of the number of clothes that are present or that have otherwise been removed from the clothes racks 516. In some aspects, the tags 520 may include individually identifying information, and the sensors 518 may transmit indications of the individually identifying information of the tags 520 to the RMS. In turn, the RMS may identify the indications and increment counters associated with the objects and/or object types for each identified indication to maintain a count of the inventory of different objects within the retail environment 500.

Upon exiting the retail environment 500 with the container 506 and/or any objects from the retail environment 500, the exit sensors 512 may detect data from the tags 520 coupled with the objects. The retail environment 500 may detect such data and transmit the data (e.g., via a gateway) to the RMS. The exit sensors 512 may also detect data indicating that the shopper 502, the user device 504, and/or the container 506 exited the retail environment 500. The exit sensors 512 may detect the data and transmit the data to the RMS for further processing. The RMS may receive the data and associate any objects with which the shopper 502 walked out of retail environment 500 with a user account of the shopper 502. The RMS may update the user account to indicate which items were associated with the user account and values of such items. In some aspects, each time the shopper 502 enters the retail environment 500 to purchase any items, the RMS may update the user account of the shopper 502 to indicate the items with which the shopper 502 exited the retail environment 500.

Figure 6:
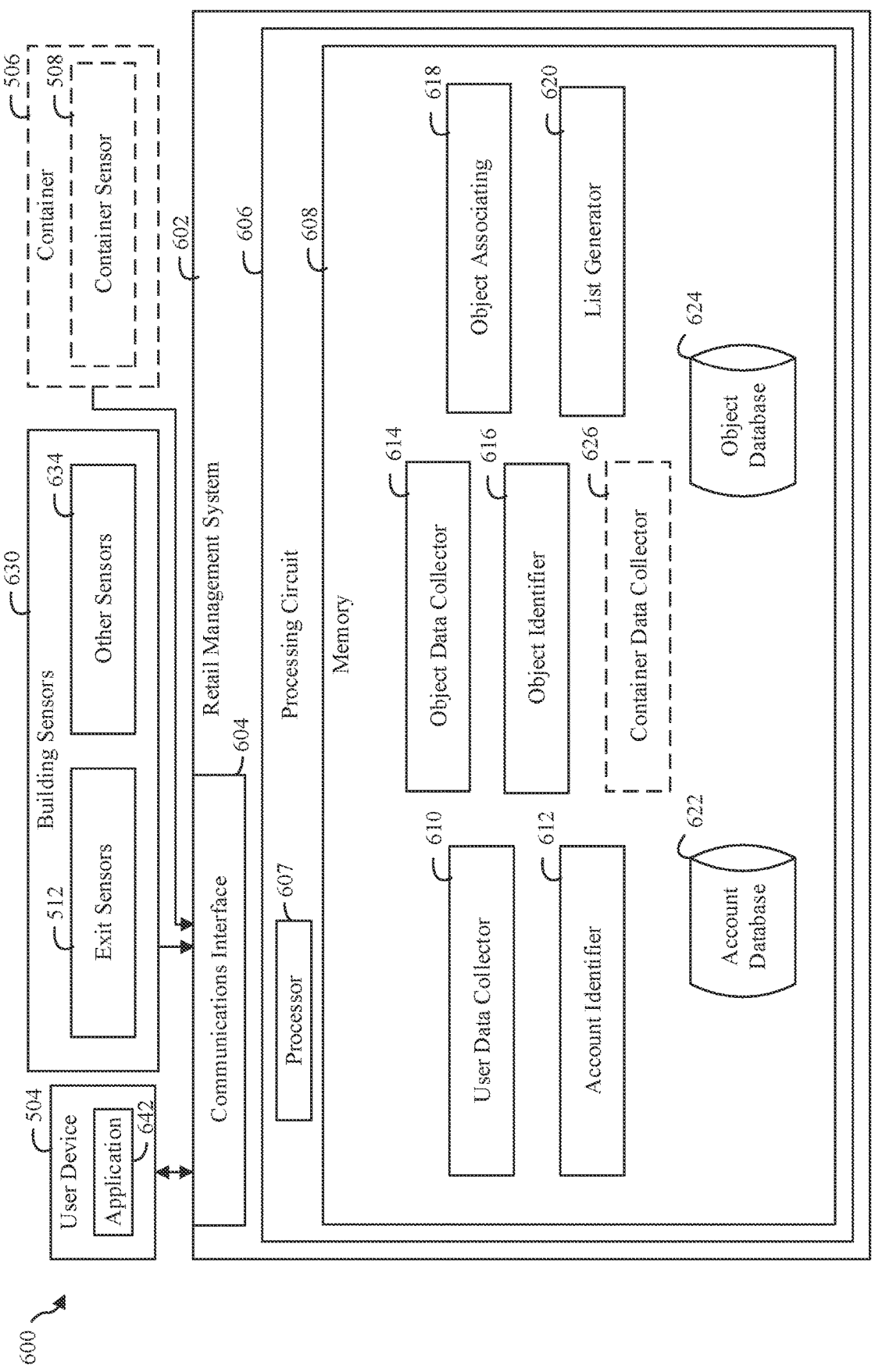
FIG. 6 is a diagram illustrating an example of a system, in accordance with various aspects of the present disclosure.

Referring now to FIG. 6, a block diagram of a system 600 including a retail management system ("RMS") 602 that may automatically associate objects with user accounts based on the objects exiting an environment (e.g., a retail store such as retail environment 500) is shown, according to an exemplary embodiment. The RMS 602 may receive sensor data indicating that one or both of an object and a shopper 502 or a container 506 exited the environment. The RMS 602 may use such sensor data to associate the object with a user account of the shopper 502 (e.g., add an identification of the object to a list of object identifications with which the shopper 502 and/or the container 506 exited the retail environment 500). The RMS 602 may aggregate values associated with each of the objects to obtain an aggregated value and transmit the aggregated value to the user device 504 associated with the shopper 502 and/or the container 506. In addition to the RMS 602 and the user device 504, the system 600 may include building sensors 630 and, in some aspects, the container 506. Each of the elements of system 600 (i.e., 602, 630, 504, 506) may communicate with each other over a network.

In some aspects, the RMS 602 may be configured to perform one or more operations described herein in connection with FIGS. 1 and 5. Alternatively or additionally, the RMS 602 may be configured to perform one or more processes described herein, such as methods 700, 800, 900, and 1000 of FIGS. 7-10, respectively. In other aspects, the RMS 602 may include one or more components of the server 124 described above in connection with FIG. 1 and of the server 400 described above in connection with FIG. 4.

The RMS 602 may include a communications interface 604, a processing circuit 606, a processor 607, and a memory 608. The memory 608 may include computer-readable instructions which, when executed by the processor 607, may cause the processor 607 to perform the one or more functions described herein. The memory 608 may be configured to store computer-readable instructions executable by control circuitry and/or other data (e.g., data pertaining to communication, configuration and/or address data of nodes, etc.). The processing circuit 606 may be configured to implement any of the methods described herein and/or to cause such methods to be performed by a processor (e.g., central processing unit 406, processor 607).

In some aspects, the memory 608 may include a set of components, such as a user data collector component 610, an account identifier component 612, an object data collector component 614, an object identifier component 616, an object associating component 618, a list generator component 620, an account database 622, an object database 624, and a container data collector component 626. Alternatively or additionally, the set of components may be separate and distinct from the memory 608. In other aspects, a component (or a portion of a component) may be implemented as instructions or code stored in a non-transitory computer-readable medium and executable by a controller or a processor to perform the functions or operations of the component. The memory 608 may include any number of components and/or modules. The processing circuit 606 may implement any of components 610-626 to process sensor data received from the building sensors 630, determine which objects and/or entities (e.g., shopper 502) are exiting the environment (e.g., retail environment 500) based on the sensor data, and associate the objects with the entities and/or user accounts of the entities. In some aspects, the processing circuit 606 may include or may be connected or communicatively coupled with the memory 608, and the memory 608 may be configured to be accessible for reading and/or writing by the processing circuit 606.

The communications interface 604 may be configured to facilitate communication with various elements of the system 600. That is, the communications interface 604 may be configured to securely communicate with the elements of the system 600 such as the building sensors 630, the container 506, and/or the user device 504. In some aspects, communications via the communications interface 604 may be direct (e.g., local wired or wireless communications) or via a communications network (e.g., a WAN, the Internet, a cellular network).

The user device 504 may be the same as or similar to the MCD 130 of FIG. 1, and may include additional features not mentioned above. The user device 504 may include any type or form of media device or computing device, including a mobile phone, smartphone, desktop computer, laptop computer, portable computer, tablet computer, wearable computer, embedded computer, smart television, set top box, console, Internet of Things (IoT) device or smart appliance, or any other type or form of media device or computing device. The user device 504 may receive media streams via any appropriate network, including local area networks (LANs), wide area networks (WANs) such as the Internet, satellite networks, cable networks, broadband networks, fiber optic networks, microwave networks, cellular networks, wireless networks, or any combination of these or other such networks. In some aspects, the networks may include a plurality of subnetworks which may be of the same or different types, and may include a plurality of additional devices (not illustrated), including gateways, modems, firewalls, routers, switches, and the like.

The building sensors 630 may include any building sensors that are coupled with or are a part of a retail store (e.g., retail environment 500). For example, the building sensors 630 may include the exit sensors 512 and other sensors 634. In some aspects, the exit sensors 512 may be configured, or may have previously been configured, to cause an alert to go off indicating that the shopper 502 is exiting the retail environment 500 with an unpaid object. The alert may comprise an audible alarm in the retail environment 500 to alert security personnel that an object that is not authorized to be removed from the retail environment 500 (e.g., not purchased) is exiting the retail environment 500. For example, the exit sensors 512 may be configured to detect tags that are designed to be removed at a cashier to indicate that a shopper 502 has paid for an associated object. The exit sensors 512 may be located at an exit and/or entrance of the retail environment 500. The exit sensors 512 may include any one of an RFID sensor, a Bluetooth sensor, an electromagnetic sensor, an electric sensor, a magnetic sensor, and the like. In some aspects, additional and/or different sensors could be used. The exit sensors 512 may include one or more sensors that are configured to detect characteristics of objects. Such characteristics may include, but are not limited to, movement and/or current location of objects in the retail environment 500. For example, the exit sensors 512 may be configured to detect when objects enter and/or exit an area of the retail environment 500. The exit sensors 512 may be configured to detecting that tag (e.g., tags 112, 118, 200, 520) that are coupled with the objects have entered and/or exited an area of the retail environment 500. Examples of tags that may be coupled with the objects may include, but are not limited to, an RFID tag, a picture, a Bluetooth tracking tag, and the like. In some aspects, the exit sensors 512 may be an RFID sensor (e.g., an RFID reader, such as readers 120, 300) that is configured to detect RFID tags within a line-of-sight of the exit sensors 512. For example, a person (e.g., shopper 502) may exit the retail environment 500 with a shirt that is coupled with an RFID tag, and the exit sensor 512 may detect that the RFID tag entered the line-of-sight of the exit sensor 512. In other aspects, the exit sensor 512 may be a magnetic sensor that is configured to detect tags using magnetic waves. The exit sensor 512 may be located at an entrance and/or exit of the retail environment 500, as such, the line-of-sight of the exit sensor 512 may be the area around the entrance and/or exit of the retail environment 500. Consequently, the exit sensor 512 may detect when an object exits the retail environment 500 based at least on detecting the tag coupled with the object.

In some aspects, the exit sensor 512 may detect characteristics of objects detected by the exit sensor 512. For example, the exit sensor 512 may detect objects and may detect information about the object. Such information may include object type, object identification number, values associated with the object, and the like. The exit sensor 512 may read information from the tag (e.g., tags 112, 118, 200, 520) associated with the object. The exit sensor 512 may transmit the detected information to the RMS 602 for further processing.

Alternatively or additionally, the exit sensor 512 may include a sensor that detects that a shopper 502 entered and/or exited the retail environment 500. The exit sensor 512 may detect that the shopper 502 entered and/or exited the retail environment 500 using multiple techniques. For example, the exit sensor 512 obtain light reflection data indicating that the shopper 502 crossed a boundary of the retail environment 500. For another example, the exit sensor 512 may include a camera and/or a video camera that may take pictures and/or video frames of the shopper 502 as they enter and/or exit the retail environment 500. In some aspects, the camera and/or video camera may be configured to take such pictures and/or video frames if or when another sensor of the exit sensor 512 detects that the shopper 502 entered the area surrounding the exit sensor 512. The exit sensor 512 may transmit the pictures and/or video frames to the RMS 602 for further processing. The RMS 602 may use various object recognition techniques to identify the shopper 502 based at least on the pictures and/or video frames transmitted by the exit sensor 512.

In some aspects, the exit sensor 512 may include a sensor that detects that a user device 504 has entered and/or exited the retail environment 500. For example, the exit sensor 512 may detect that the user device 504 has entered and/or exited the retail environment 500 if or when the shopper 502 scans the user device 504 against the exit sensor 512. That is, the exit sensor 512 may include a scanner configured to scan the user device 504 at the entrance and/or exit of the retail environment 500. If or when the shopper 502 enters and/or exits the retail environment 500, the shopper 502 may scan their user device 504 against the exit sensor 512. The shopper 502 may scan their user device 504 using a personalized barcode such as a one-dimensional, a two-dimensional, or a three-dimensional barcode (or any other picture) that is displayed on their user device 504. The barcode may be individually associated with the user device 504 and, in some aspects, a personalized user account. The shopper 502 may scan their user device 504 using any form of individually identifying identification on the display of their user device 504. The exit sensor 512 may transmit the data obtained from the scan to the RMS 602 for further processing.

In some aspects, the exit sensor 512 may include a beacon that may communicate (e.g., via Bluetooth or Bluetooth Low Energy signals) with the user device 504 as the user device 504 enters and/or exits the retail environment 500. The user device 504 may detect signals from the beacon and/or transmit signals to the beacon. The beacon signals may include information identifying the user device 504. The RMS 602 may use the beacon signals from the user device 504 to individually identify the user device 504.

In some aspects, the exit sensor 512 may include a sensor configured to detect containers (e.g., container 506). The container 506 may be a cart (e.g., a shopping cart), a bag, a box, a basket, or any other container in which objects may be placed. Identification tags may be coupled with the containers 506 that may be individually associated with their respective containers 506. The exit sensor 512 may be configured to detect the identification tags when the associated containers 506 enter the line-of-sight of the exit sensor 512. The exit sensor 512 may detect the identification tags and transmit data identifying the container 506 (e.g., an identification number) to the RMS 602 for further processing.

The other sensors 634 may be sensors located at the retail environment 500 that detect other information about the operation of the retail environment 500. For example, the other sensors 634 may detect locations at which the shopper 502 is moving around the retail environment 500. Alternatively or additionally, the other sensors 634 may detect heat from the shopper 502 as they walk around the retail environment 500. The RMS 602 may receive the heat signals and generate a heat map indicating the most trafficked areas of the retail environment 500 over a period of time. Advantageously, an administrator may adjust product placement within the retail environment 500 according to the heat map.

Continuing to refer to FIG. 6, the user data collector component 610 of the RMS 602 may include computer-readable instructions performed by one or more servers or processors (e.g., server 124, server 400, processing circuit 606, processor 607). In some aspects, the user data collector component 610 may be configured to collect data from the exit sensor 512 that is associated with the shopper 502 as they enter and/or exit the retail environment 500. For example, the user data collector component 610 may receive indications that the shopper 502 previously exited or is currently exiting the retail environment 500. The indications may comprise scans of the user device 504 corresponding to the shopper 502, pictures and/or video frames of the shopper 502 exiting the retail environment 500, signals indicating that the shopper 502 passed through the exit area, or any other indication that the shopper 502 passed through the entrance and/or exit of the retail environment 500. In some aspects, the user data collector component 610 may collect the user data and store the user data in a database within the RMS 602 (e.g., datastore 126, account database 622).

The account identifier component 612 may include computer-readable instructions performed by one or more servers or processors (e.g., server 124, server 400, processing circuit 606, processor 607). In some aspects, the account identifier component 612 may be configured to compare the user data collected by the user data collector component 610 to a database (e.g., datastore 126, account database 622) to identify a user account that is associated with the collected user data. The user data collector component 610 may use any type of user data to identify the user account. For example, the user data collector component 610 may receive data obtained from a scan of the user device 504 as the shopper 502 entered and/or exited the retail environment 500. The data may contain an identification number that is associated with a specific user account of the account database 622. The account identifier component 612 may compare the identification number obtained from the scan with the account database 622 to identify the user account of the shopper 502 who scanned their user device 504. In some aspects, the user device 504 may be associated with a device identification number. The device identification number may be associated with a user account in the account database 622. The user data collector component 610 may receive a device identification number of the user device 504 obtained by the exit sensor 512 (e.g., from a beacon signal from the user device 504), and the account identifier component 612 may identify a user account from the account database 622 using the device identification number. That is, in some aspects, the account identifier component 612 may identify a user account from the account database 622 without identifying the identity of the shopper 502.

In another example, the account identifier component 612 may use object recognition techniques to determine which user account is associated with the shopper 502 that has entered and/or exited the retail environment 500. The user data collector component 610 may receive pictures and/or video frames of the shopper 502 who has recently entered and/or exited the retail environment 500. The account identifier component 612 may analyze the pictures and/or video frames using object recognition techniques to identify the identity of the shopper 502 in the pictures and/or video frames. For example, the account identifier component 612 may identify the shopper 502 from a picture of the shopper 502 exiting the retail environment 500 taken by a camera of the exit sensor 512. In some aspects, the account identifier component 612 may compare the pictures and/or video frames to a database (e.g., account database 622) containing pictures and/or video frames of one or more shoppers 502. The account identifier component 612 may identify a picture and/or video frame from the database by determining that the picture and/or video frame from the database is the most similar to the picture and/or video frame of the shopper 502 existing the retail environment 500 (e.g., based on common corresponding pixels between the two pictures and/or video frames). The identified picture from the database may be associated with a user account in the account database 622. The account identifier component 612 may select the user account associated with the identified picture from the account database 622. As such, the account identifier component 612 may identify user accounts that are associated with the shopper 502 that is exiting the retail environment 500.

In some additional or optional aspects, the account identifier component 612 may identify user accounts based on facial features of the shopper 502. Continuing with the example above, the account identifier component 612 may use object recognition techniques on the pictures and/or video frames to identify faces and/or facial features of the shopper 502. Examples of facial features may include the size of and/or location of features of the face such as their nose, eyes, chin, cheeks, eyebrows, mouth, teeth, forehead, or any other facial features. In some aspects, the facial features may be defined as pixels in the pictures and/or video frames and may be identified from such pictures and/or video frames. In other aspects, the facial features may include the pixels of entire faces. The account identifier component 612 may compare the pixels of the facial features to a database similar to above and identify matching facial features associated with various user accounts. The user accounts may be associated with one or more pictures and/or video frames to which identified facial features may be matched. In some aspects, the account identifier component 612 may identify the matching facial features to a certain level of confidence that is determined based on the number of pixels that exactly match or that are a close match. That is, the account identifier component 612 may calculate a confidence score for one or more user accounts in the account database 622 based on a comparison of the pictures and/or video frames of the shopper 502 with the respective pictures and/or video frames associated with the one or more accounts in the account database 622. The account identifier component 612 may compare the confidence scores to a threshold, and if or when the confidence score exceeds the threshold, determine that the corresponding user account matches the shopper 502 appearing in the pictures and/or video frames. If or when the account identifier component 612 determines that there is not a match, the account identifier component 612 may continue determining confidence scores with other user accounts until a user account associated with a confidence score that exceeds the threshold may be identified. If or when a user account cannot be identified, the account identifier component 612 may generate an alert and send the alert to an administrator. In some aspects, the alert may comprise an audible alarm in the retail environment 500 to alert security personnel that an object that is not authorized to be removed from the retail environment 500 (e.g., not purchased) is exiting the retail environment 500.

The exit sensor 512 may include a biometric sensor. In some aspects, the biometric sensor may be a high definition camera that captures data for nodal points on a digital image of the face of the shopper 502. The nodal points may be endpoints on the face of the shopper 502 that may be used to identify the shopper 502. Examples of end points may include length and width of the nose, cheekbone shape, and eye socket depth. The end points may include other face characteristics of a person that may be used to identify the shopper 502. In other aspects, the biometric sensor may obtain other biometric data for identifying user accounts (e.g., retina scans, fingerprints, voice scans, pace analysis, and the like). The account identifier component 612 may obtain and/or determine the data from the biometric sensor, and identify user accounts that are associated with similar data by comparing the data to a database similar to above.

Alternatively or additionally, the biometric sensor may include facial recognition aspects in addition to or instead of the account identifier component 612 to identify the identity of the shopper 502. That is, the biometric sensor and/or the account identifier component 612 may identify the identity of shoppers similar to the above (e.g., based on matching facial features such as pixels or nodal points). The account identifier component 612 may identify the user account associated with the identified shopper 502 by comparing the identity (e.g., the shopper's name) of the shopper 502 to a database and identifying a user account that is associated with a matching identity.

The account database 622 may be a dynamic database including user account data that is associated with various shoppers 502 that enter and/or exit the retail environment 500. For example, the account database 622 may be a graph database, MySQL, Oracle, Microsoft SQL, PostgreSql, DB2, document store, search engine, key-value store, and the like. In some aspects, the account database 622 may be configured to store user account data such as, a history of purchases that the shopper 502 has transacted at the retail environment 500, an indication of the amount of time that the shopper 502 has spent at the retail environment 500, a counter indicating a number of times that the shopper 502 have entered the retail environment 500 and/or made purchases at the retail environment 500, data indicating trends of purchases made at the retail environment 500, and the like.

All or a portion of the user accounts that are stored in the account database 622 may be associated with an identifier that may be used to associate the shopper 502 with their user account. The identifiers may be associated with user device identifiers (e.g., dimensional barcodes as described above, device identification numbers, other pictures, etc.). Each user account may be associated with all or a portion of such identifiers.

In some aspects, a user account of the account database 622 may be associated with an application 642. The application 642 may include programmed instructions that enable the user device 504 to interact with the RMS 602. The application 642 may be stored in the user device 504. In some aspects, the application 642 may enable the user device 504 to communicate with the RMS 602 via a user interface. The user interface may illustrate information about a user account of the user device 504. The user account may be individually associated with the user device 504. In some aspects, the user interface may also show a barcode for the user (e.g., shopper 502) to scan upon entering and/or exiting the retail environment 500. The account identifier component 612 may obtain data from the scan and identify the user account associated with the application 642 by comparing the data to the account database 622. That is, in some aspects, the account identifier component 612 may identify a user account from the account database 622 without identifying the identity of the shopper 502. The account database 622 may store data about user accounts indicating with which user device 504 and/or application 642 is associated.

The object data collector component 614 may include computer-readable instructions performed by one or more servers or processors (e.g., server 124, server 400, processing circuit 606). In some aspects, the object data collector component 614 may be configured to obtain data from the exit sensor 512 that is associated with various objects of the retail environment 500. As described above, the exit sensor 512 may obtain data about the objects from the retail environment by scanning tags that are coupled with the objects as the objects enter a scanning line-of-sight of the exit sensor 512. The object data may be identifying information about the objects such as object identification number, object type, object name, object value, a picture or video of the object, etc. For example, the exit sensor 512 may scan an RFID tag (e.g., 112, 118, 200, 520) coupled with an object that a shopper 502 is carrying out of the retail environment 500. The exit sensor 512 may obtain information specific to the RFID tag (e.g., object identification number, object type, or object name) and transmit the information to the object data collector component 614. In another example, a shopper 502 may exit the retail environment 500 with an object that is coupled with a magnetic tag. The exit sensor 512 may obtain information from the magnetic tag and transmit the information to the object data collector component 614. In yet another example, the object data collector component 614 may collect pictures of the objects as the objects exit the retail environment 500 with the shopper 502. The exit sensor 512 may take pictures and/or video frames of the objects as the objects exit the retail environment 500 and transmit the pictures and/or video frames to the object data collector component 614 for further processing. That is, the object data collector component 614 may collect data from the objects at each instance that the shopper 502 exits the retail environment 500 with the objects.

The object identifier component 616 may include computer-readable instructions performed by one or more servers or processors (e.g., server 124, server 400, processing circuit 606). In some aspects, the object identifier component 616 may be configured to use the object data that is transmitted to the RMS 602 to identify which objects shoppers are taking out of the retail environment 500 (e.g., purchasing). The object identifier component 616 may identify the object data that is passed to the RMS 602. The object data may include at least one of object identification number, object type, object name, and the like. The object identifier component 616 may identify the object data and compare the object data to the object database 624 to identify a corresponding object from the database. The corresponding object may be associated with an object name and/or object value. The object identifier component 616 may identify corresponding objects from the object database 624 to determine which objects shoppers are attempting to be purchased from the retail environment 500. In some aspects, the object identifier component 616 may use data from the tags coupled with the objects to identify objects that the shopper 502 is attempting to purchase. The object identifier component 616 may identify the objects if or when the identifying information scanned from the tags is sufficient to identify the objects.

The object database 624 may be a database that is similar to the account database 622. The object database 624 may include information about various objects of the retail environment 500. Such information may include object name, value, type, and the like. In some aspects, the object database 624 may store an inventory of the objects that are currently present in the retail environment 500. The object database 624 may automatically update the inventory as the RMS 602 determines that objects have been removed and/or added to the retail environment 500. The objects of the object database 624 may be individually associated with identifiers that are associated with tags that may be coupled with the objects. As such, the object identifier component 616 may use identifiers obtained from tag scans to identify which objects the shopper 502 is attempting to purchase from the retail environment 500.

The object associating component 618 may include computer-readable instructions performed by one or more servers or processors (e.g., server 124, server 400, processing circuit 606). In some aspects, the object associating component 618 may be configured to associate objects with user accounts as the shopper 502 exits the retail environment 500 with such objects. The object associating component 618 may use data obtained from tags (e.g., 112, 118, 200, 520) of the objects to associate the objects with the user accounts. For example, in some aspects, the object associating component 618 may determine that an object has been removed from or has exited the retail environment 500. The object associating component 618 may make such a determination based on data obtained from a tag that is coupled with the object. The object associating component 618 may also determine the user account of the shopper 502 that has exited the retail environment 500. The object associating component 618 may determine the user account of the shopper 502 using data obtained from the shopper 502 exiting the retail environment 500 (e.g., using device identifiers or object character recognition on a picture and/or video frame of the shopper 502 exiting the retail environment 500). Based on both the object and the shopper 502 exiting the retail environment 500, the object associating component 618 may associate the object with the user account of the shopper 502 exiting the retail environment 500.

The object associating component 618 may store the associations between the objects and the user account of the shopper 502 in a database of the RMS 602. In some aspects, the object associating component 618 may store the associations as being part of a session. The session may be a time interval in which the object associating component 618 identifies multiple objects to associate with the user account of the shopper 502. For example, the time interval may be one second, five seconds, 10 seconds, a minute, 30 minutes, and the like. The object associating component 618 may associate each object with the session and send indications of the associations to the application 642 allowing a user (e.g., shopper 502) to view which objects the user has purchased when the user exited the retail environment 500.

In some aspects, the object associating component 618 may associate objects with user accounts based on the times that each of the objects and that the shoppers 502 associated with the user accounts exited the retail environment 500. In some aspects, the user data collector component 610 may tag data that the user data collector component 610 collects with a timestamp indicating when the RMS 602 received the data and/or when the data was generated. That is, the user data collector component 610 may collect timestamps indicating when the shopper 502 entered and/or exited the retail environment 500. Similarly, the object data collector component 614 may tag data related to tags of objects that the object data collector component 614 collects with timestamps indicating when the data was collected and/or generated. That is, the object data collector component 614 may collect timestamps indicating when objects exited the retail environment 500. The timestamps may also indicate when the associated object and/or the shopper 502 exited the retail environment 500. The object associating component 618 may identify the data indicating the times that the objects exited the retail environment 500 and the times that the shopper 502 exited the retail environment 500 and determine which user accounts to associate with the objects based on the identified times.

The object associating component 618 may use the times to associate the objects with the user account by determining differences between the timestamps of the object data and the user account data. The object associating component 618 may determine differences between the time that the object data was collected (e.g., when the objects exited the retail environment 500) and the time that the user account data was collected (e.g., when the shopper 502 exited the retail environment 500). The object associating component 618 may compare the time differences with a threshold or a time period. If or when the object associating component 618 determines a time difference between object data of an object and user account data of a user account to be less than the threshold (or the time period), the object associating component 618 may associate the object with the user account. For example, a shopper 502 may exit the retail environment 500 holding one object (e.g., a shirt). The account identifier component 612 may use object recognition techniques to identify the user account associated with the shopper 502. The object identifier component 616 may identify the shirt based on data collected from a tag coupled with the shirt. The object associating component 618 may determine that the shirt exited the retail environment 500 half a second after the shopper 502 exited the retail environment 500 based on the timestamps that are associated with the user account data and/or the object data. The object associating component 618 may compare the half a second time difference to a threshold (e.g., two seconds) and determine that the shopper 502 and the shirt exited the retail environment 500 within the threshold. As a result, the object associating component 618 may associate the shirt with the user account of the shopper 502 that exited the retail environment 500.

Alternatively or additionally, the object associating component 618 may use signal strength of signals obtained from tags coupled with objects to determine which user account to associate with various objects. Using the signal strength may be advantageous when two shoppers 502 and/or containers 506 exit the retail store within a small time frame (e.g., within a time smaller than a threshold). The signal strength may be a magnetic field strength, a light reflection strength, an RFID signal strength, an electric field strength, or another indication of signal strength. The signal strength may correspond to a distance that objects are from the exit sensor 512 when the exit sensor 512 detects that the objects are exiting the retail environment 500. The object associating component 618 may identify the signal strength of the signals that the object data collector component 614 uses to collect data about objects that exit the retail environment 500. The object associating component 618 may identify the shopper 502 and/or the container 506 to associate with the objects based on the identified signal strength and associate the objects with a user account that is associated with the shopper 502 and/or the container 506.

In other optional or additional aspects, the user data collector component 610 and the account identifier component 612 may cooperate to identify the user accounts that are associated with the first shopper 502 and the second shopper 502. That is, the account identifier component 612 may identify which shopper 502 (i.e., first shopper 502 or second shopper 502) is further away from the exit sensor 512 using the data that the user data collector component 610 collected. For example, the account identifier component 612 may identify which shopper 502 is further away from the exit sensor 512 using object recognition techniques on a picture and/or video frame of the two shoppers 502 exiting the retail environment 500 (e.g., identify which shopper 502 is closer to the exit sensor 512 based on the picture and/or video frame). For example, the account identifier component 612 may identify which shopper 502 is further away from the exit sensor 512 based on a first signal strength of a first beacon signal from a first user device 504 of the first shopper 502 and on a second signal strength of a second beacon signal from a second user device 504 of the second shopper 502.

In other optional or additional aspects, the account identifier component 612 may identify which container 506 is further away from the exit sensor 512 based on a first signal strength of a scan of the first container 506 (e.g., scan of a tag coupled with the first container 506) and on a second signal strength of a scan of the second container 506 (e.g., scan of a tag coupled with the second container 506). The object data collector component 614 and the object identifier component 616 may cooperate to identify the objects in each container 506 (i.e, first container 506 and second container 506) from the tags that are coupled with the objects. For example, the time at which the first objects in the first container 506 exited the retail environment 500 may be within the threshold from the time that the first shopper 502 exited the retail environment 500, and the time at which the second objects in the second cart 506 exited the retail environment 500 may within the threshold from the time that the second shopper 502 exited the retail environment 500.

Alternatively or additionally, the object associating component 618 may identify the signal strength of the signals that were used to identify the objects of the first cart 506 and the objects of the second cart 506. The object associating component 618 may compare the signal strengths to determine which objects are associated with a higher signal strength. For example, the object associating component 618 may match the objects with the higher signal strength with the user account of the shopper 502 that the account identifier component 612 determined to be closer to the exit sensor 512 and/or match the objects with the lower signal strength with the user account of the shopper 502 that the account identifier component 612 determined to be further away from the exit sensor 512. That is, the object associating component 618 may associate objects with user accounts when objects, the containers 506, and/or the shoppers 502 exit the retail environment 500 at a similar time (e.g., within the threshold).

The list generator component 620 may include computer-readable instructions performed by one or more servers or processors (e.g., server 124, server 400, processing circuit 606). In some aspects, the list generator component 620 may be configured to generate a list of objects that have been associated with a user account and transmit the list to an application (e.g., application 642) associated with the user account. The list generator component 620 may identify each of the objects that have been associated with the user account and the values associated with the objects. The list generator component 620 may aggregate identifications of the objects into a list with associated values to be displayed on a user interface. The list generator component 620 may transmit the user interface (or an update to a user interface) to the application 642 to display to a user (e.g., shopper 502). In some aspects, the list generator component 620 may aggregate the values associated with the objects to generate an aggregated value. The list generator component 620 may include the aggregated value on the user interface for display by the user device 504. As such, the user (e.g., shopper 502) may view a list of objects that the user purchased from the retail environment 500, values associated with the objects, and/or an aggregated total of the values associated with the objects.

Alternatively or additionally, the list generator component 620 may update the account database 622 to indicate that the user exited the retail environment 500 with each of the objects on the list. The list generator component 620 may update information associated with a user account of the user to keep track of the amount and types of objects that the user purchased and purchases over time. In some aspects, the user may access (e.g., using the application 642) such user account information to view their purchasing history and habits and how such habits have changed over time.

In some aspects, the memory 608 may include the container data collector component 626. The container data collector component 626 may include computer-readable instructions performed by one or more servers or processors (e.g., server 124, server 400, processing circuit 606). In some aspects, the container data collector component 626 may be configured to collect data about the containers 506 of the retail environment 500. The containers 506 may be at least one of a cart, a bag, a box, a basket, and the like. For example, the container data collector component 626 may collect data about the container 506. In some aspects, a tag (e.g., an RFID tag, a magnetic tag, a picture, a Bluetooth tracking tag) may be coupled with or a part of the container 506 which may be detected by the exit sensor 512. The container data collector component 626 may collect data from the exit sensor 512 that indicates that the container 506 has been detected and/or is exiting the retail environment 500. The container data may identify a number and/or type of the container 506 from the container data. The container data collector component 626 may also identify a particular container that was detected based on the container data. The container data collector component 626 may identify the container by comparing the detected container data to a database (e.g., account database 622) and identifying a matching or corresponding container from the database.

In some aspects, the user (e.g., shopper 502) may associate their user account with the container 506. The user may associate their user account with the container 506 upon entering and/or exiting the retail environment 500. That is, if or when the user associated with the user account exits the retail environment 500 with the container 506, the account identifier component 612 may determine that the user exited the retail environment 500 based on data obtained from scanning the container 506 rather than based on data obtained from the shopper 502 (e.g., shopper 502 scanning user device 504 at exit). For example, upon entering the retail environment 500 to shop, a shopper 502 may scan their user device 504 into the exit sensor 512. The shopper 502 may also select, from the user interface (e.g., application 642), an identifier (e.g., a container number) of a container 506 that the user may use while shopping in the retail environment 500. The account identifier component 612 may identify the user account of the shopper 502 from the scan of the user device 504 and associate the user account with the container 506 based on the selection from the user interface. In another example, the shopper 502 may associate their user account with the container 506 by scanning their user device 504 into the exit sensor 512 and/or scanning a tag coupled with the container into the exit sensor 512. The account identifier component 612 may associate the user account with the container 506 based on the scans. That is, the account identifier component 612 may associate the user account with the container 506 based on the shopper 502 performing the scans within a threshold amount of time and/or based on a selection from the user interface.

In some aspects, detecting that the container 506 that is associated with a user account is exiting the retail environment 500 may be used to determine that the shopper 502 associated with the user account is exiting the retail environment 500. For example, the object associating component 618 may determine that the container 506 exited the retail environment 500, identify the user account associated with the container 506 that exited, identify objects that were detected as exiting within a threshold amount of time as the container 506, and associate the identified objects with the user account that is associated with the container 506. As such, the RMS 602 may associate objects with user accounts based on signals from the containers 506 instead of or in addition to using signals from user devices 504 or relying on visual analysis of photos and/or video frames to determine which user accounts to associate with objects that are detected as exiting the retail environment 500.

For example, a shopper 502 may walk into the retail environment 500 and pick up a shopping bag (e.g., container 506). The shopping bag 506 may have an identification number affixed to the shopping bag 506. The shopper 502 may scan their user device 504 and input the shopping bag identification number into a user interface of the RMS 602 (e.g., application 642). The container data collector component 626 and/or the account identifier component 612 may identify the information from the user device 504 and the shopping bag identification number and associate the shopping bag 506 with the user account of the shopper 502. The shopper 502 may shop around the retail environment 500 by placing multiple objects into the shopping bag 506. Once the shopper 502 finishes shopping, the shopper 502 may exit the retail environment 500 with the shopping bag 506 in hand. The object associating component 618 may obtain data indicating that the objects in the shopping bag 506 and that the shopping bag 506 exited the retail environment 500 within a time period that does not exceed a threshold. The object associating component 618 may identify the user account associated with the shopping bag 506 and associate the objects within the shopping bag 506 with the user account based on the shopping bag 506 and the items in the shopping bag exiting the retail environment 500 within a time difference under the threshold.

In some aspects, objects may be actively associated with entities such as the shopper 502 and/or the container 506 as the shopper 502 walks around the retail environment 500 and either add the objects to the container 506 or picks up the objects for purchase without adding the objects to the container 506. For example, the shopper 502 may shop in the retail environment 500 and push around the container 506. The shopper 502 may have associated their user account with the container 506 as described above. In other aspects, the container sensor 508 coupled with the container 506 may scan objects that are added to the container 506. In other aspects, the container sensor 508 may not be coupled with the container 506. The container sensor 508 may detect characteristics of objects and tags on objects similar to the exit sensor 512. As the shopper 502 pushing the container 506 adds objects to the container 506, the container sensor 508 may scan tags of the objects and transmit object data to the RMS 602 to indicate which objects have been added to the container 506. If or when the shopper 502 decides to remove an object from the container 506, the container sensor 508 may scan the object as the object is being removed and send an indication to the RMS 602 to indicate that the object has been removed from the container 506. If or when the shopper 502 has finished shopping, the shopper 502 may push the container 506 out of the retail environment 500. The RMS 602 may detect that the container 506 has exited the retail environment 500, identify the objects that have been identified as being added to the container 506, and associate the identified objects with the user account associated with the container 506.

Alternatively or additionally, the shopper 502 may hold a sensor similar to the container sensor 508 as the shopper 502 walks around the retail environment 500. The sensor may have been previously associated with a user account of the shopper 502. The shopper 502 may pick up an object that the shopper 502 desires to purchase and scan the object. The shopper 502 may proceed to exit the retail environment 500. If or when the shopper 502 exits the retail environment 500, the RMS 602 may identify the shopper 502 (e.g., using object identification or based on signals from the shopper's user device 504). The RMS 602 may identify the objects that the shopper 502 has scanned and associate the identified objects with the shopper's user account.

In some aspects, as the container sensor 508 detects objects that are added to the container 506, the list generator component 620 may generate a virtual shopping cart. The virtual shopping cart may include identifications of the objects that the container sensor 508 has detected as being added to the container 506 along with values associated with the objects. As the shopper 502 adds and/or removes objects from the container 506, the list generator component 620 may add and/or remove corresponding object identifications from the virtual shopping cart, respectively. If or when the shopper 502 exits the retail environment 500 with the container 506, the object associating component 618 may identify the virtual shopping cart and associate the object identifications of the virtual shopping cart with the user account of the shopper 502. Advantageously, by using the virtual shopping cart, the exit sensor 512 may scan and/or identify the shopper 502 and/or container 506 for the object associating component 618 to determine which objects to associate with a user account, reducing opportunities for errors that may occur from data generated by the exit sensor 512 at the exit and/or entrance of the retail environment 500.

Figure 7:
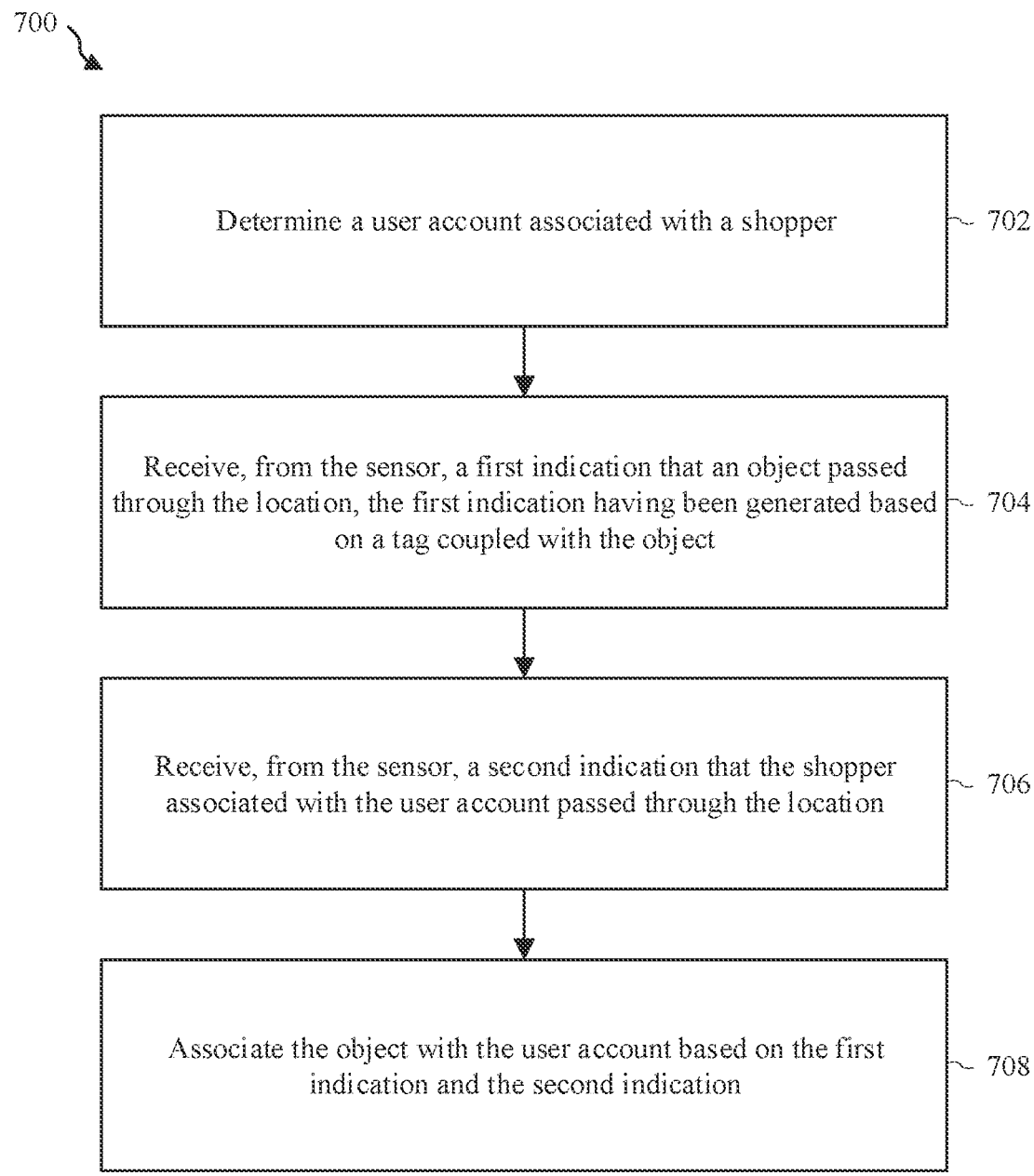
FIG. 7 is a flowchart of a first example method for operating an automated checkout system, in accordance with various aspects of the present disclosure.

Referring to FIG. 7, in operation, the retail management system 602 may perform a method 700 of operating an automated checkout system. The method 700 may be performed by the RMS 602 (which may include the memory 608 and which may be the entire RMS 602 and/or one or more components of the RMS 602, such as processing circuit 606, processor 607, and/or memory 608). The method 700 may be performed by the RMS 602 in communication with the user device 504, the container 506, and the building sensors 630.

At block 702, the method 700 includes to determine a user account associated with a shopper. For example, in an aspect, the RMS 602, the processing circuit 606, processor 607, the memory 608, the user data collector component 610, and/or the account identifier component 612 may be configured to or may comprise means to determine the user account associated with the shopper 502.

For example, the determining at block 702 may include analyzing data that the RMS 602 receives from the exit sensor 512 located at the entrance and/or exit of the retail environment 500. The data may include data obtained from the user device 504 of the shopper 502. In some aspects, the determining at block 702 may further include receiving user device data that individually identifies the user device 504 and/or an account of the user device 504. For example, the receiving may include receiving a signal, such as a Bluetooth signal, that includes a device identifier and/or receiving data obtained from a scan of a barcode displayed at the user interface (e.g., application 642) of the user device 504. The RMS 602 may identify the received data and compare the received data with user account data stored in the account database 622. That is, the RMS 602 may identify a user account that is associated with the matching data and determine the user account based on the matching data. For example, in some aspects, the RMS 602 may identify a user account from the account database 622 without identifying the identity of the shopper 502.

In other optional or additional aspects, the RMS 602 may receive picture and/or video data of the shopper 502 entering and/or exiting the retail environment 500. The RMS 602 may use object recognition techniques on the picture and/or video data to identify the shopper 502 appearing in the picture and/or video data. For example, the RMS 602 may identify the shopper 502 based on a picture of the shopper 502 that the shopper 502 uploaded to the RMS 602 via the application 642 on their user device 504. Based on the identified identity, the RMS 602 may determine the user account of the shopper 502 that entered and/or exited the retail environment 500.

In other optional or additional aspects, the determining at block 702 may further include identifying the shopper 502 based on biometric information. For example, the exit sensor 512 may include a biometric sensor and the RMS 602 may utilize facial recognition technology to identify the shopper 502 entering and/or exiting the retail environment 500. In such an aspect, the biometric sensor may generate facial feature biometric data such as nodal points (e.g., end points on the face of a shopper 502) to identify the shopper 502. The biometric sensor and/or the RMS 602 may identify the shopper 502 based on the biometric data and the RMS 602 may identify a user account associated with the shopper 502 based on the identity.

Further, for example, the determining at block 702 may be performed to identify the user account of the shopper 502 that is entering and/or exiting the retail environment 500. Such an identification may allow the RMS 602 to automatically associate purchases made by the shopper 502 to the user account of the shopper 502.

At block 704, the method 700 includes to receive, from the sensor, a first indication that an object passed through the location, the first indication having been generated based on a tag coupled with the object. For example, in an aspect, the RMS 602, the processing circuit 606, processor 607, the memory 608, the object data collector component 614, and/or the object identifier component 616 may be configured to or may comprise means to receive, from the exit sensor 512, the first indication that the object passed through the location 510, the first indication having been generated based on the tag 520 coupled with the object.

For example, the receiving at block 704 may include the exit sensor 512 transmitting identification information of the tag 520 to the object data collector component 614 to indicate that the object has entered the field of view of the exit sensor 512 (e.g., the object is exiting and/or is being removed from the retail environment 500). The object data collector component 614 may receive the tag data (e.g., identification information) and identify which object is exiting the store from the tag data (e.g., by comparing the tag data to the object database 624 and identifying an object with matching tag data).

In other optional or additional aspects, the first indication may include identification of the object to which the tag is coupled. Alternatively or additionally, the first indication may include a timestamp indicating when the first indication was generated. In some aspects, the object data collector component 614 may generate a timestamp to identify the time that the object data collector component 614 received the first indication.

Further, for example, the receiving at block 704 may be performed to identify an object that has exited or is exiting the retail environment 500. Such an identification may allow the RMS 602 to automatically associate the object with a shopper 502 and assign the purchase of the object to the shopper 502.

At block 706, the method 700 includes to receive, from the sensor, a second indication that the shopper associated with the user account passed through the location. For example, in an aspect, the RMS 602, the processing circuit 606, processor 607, the memory 608, the user data collector component 610, and/or the account identifier component 612 may be configured to or may comprise means to receive, from the sensor 512, a second indication that the shopper 502 associated with the user account passed through the location 510.

For example, the receiving at block 706 may include tracking the shopper 502 as the shopper 502 moves around the retail environment 500 and receiving the second indication when the shopper 502 exits the retail environment 500. The second indication that the shopper 502 associated with the user account passed through the location (e.g., exit area 510) may include similar data to the data that is used to determine the user account of the shopper 502 (e.g., visual data, device data, and/or account identification data). In some aspects, the second indication may be light reflection data indicating that the shopper 502 crossed a boundary of the retail environment 500.

In other optional or additional aspects, the receiving at block 706 may be performed similarly to or in conjunction with block 702 as described above. For example, the receiving of the second indication may be the same indication that the RMS 602 used to determine the user account associated with the shopper 502 as described in block 702. That is, the RMS 602 may determine the user account associated with the shopper 502 when the shopper 502 exits the retail environment 500.

Further, for example, the receiving at block 706 may be performed to identify the shopper 502 that has exited or is exiting the retail environment 500. Such an identification may allow the RMS 602 to automatically assign object purchases to the shopper 502.

At block 708, the method 700 includes to associate the object with the user account based on the first indication and the second indication. For example, in an aspect, the RMS 602, the processing circuit 606, processor 607, the memory 608, and/or the object associating component 618 may be configured to or may comprise means to associate the object with the user account based on the first indication and the second indication.

For example, the associating at block 708 may include the first indication having a corresponding first timestamp and the second indication having a corresponding second timestamp. The first and second timestamps may indicate times in which the RMS 602 received the respective indications or times in which the data of the indications was generated by the exit sensor 512. The object associating component 618 may compare the timestamps to determine a difference between the times of the timestamps. The object associating component 618 may compare the difference to a threshold, and if or when the difference is less than the threshold, the object associating component 618 may associate the object with the user account. If or when the difference is greater than the threshold, the object associating component 618 may generate an alert and send the alert to an administrator. In some aspects, the alert may comprise an audible alarm in the retail environment 500 to alert security personnel that an object that is not authorized to be removed from the retail environment 500 (e.g., not purchased) is exiting the retail environment 500.

In some aspects, the first and/or second indications may be associated with a signal strength or distance from the exit sensor 512 when the signals were generated. For example, the first indication that the object passed through the location 510 may be associated with a Bluetooth signal strength or an RFID signal strength. The second indication may be associated with a device identification signal (e.g., Bluetooth signal) strength and/or a distance that the shopper 502 is from the exit sensor 512 according to visual data.

In other optional or additional aspects, the object associating component 618 may use the signal strengths of the first and second signals if or when multiple shoppers 502 exit the retail environment 500 within a threshold amount of time. The threshold may be the same threshold that is used to associate objects with user accounts as described above. For example, the object associating component 618 may receive signals indicating a first shopper, a first object, a second shopper, and a second object all exited the retail within a threshold amount of time. In such an aspect, the object associating component 618 may determine the strength of the signals that are associated with the first object and the second object. The object associating component 618 may also determine distances that one or both of the first shopper and the second shopper are from the exit sensor 512 at the exit of the retail environment 500. The object associating component 618 may associate the first object with the first shopper and the second object with the second shopper based on the signal associated with the first object being stronger than the signal associated with the second object and the first shopper being closer to the exit sensor than the second shopper when they exit the retail environment 500.

Further, for example, the associating at block 708 may be performed to associate the objects carried out of the retail environment 500 by the shopper 502. Advantageously, the RMS 602 may differentiate between multiple shoppers 502 as they exit with their respective objects and associate the respective objects with the correct user accounts.

Figure 8:
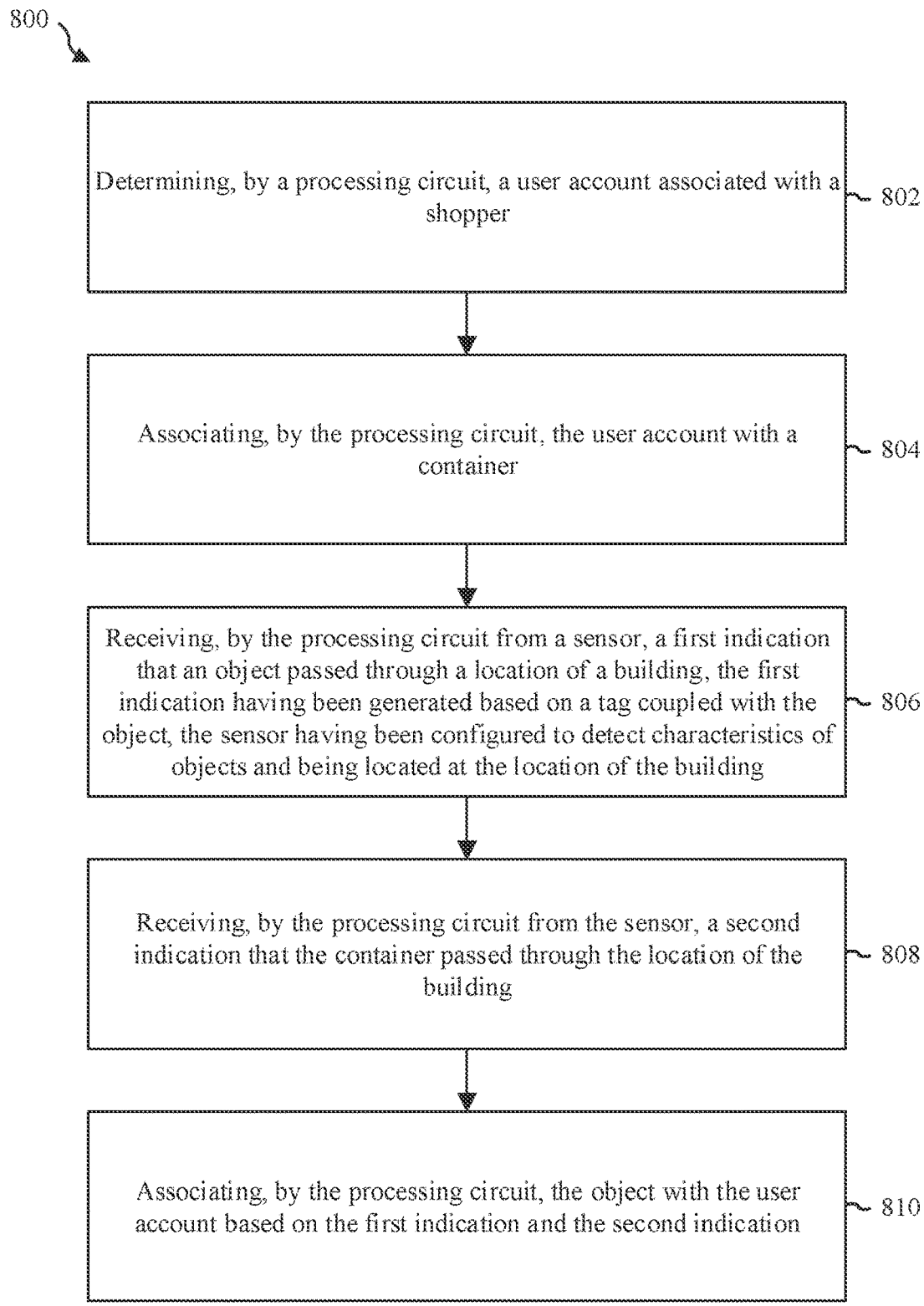
FIG. 8 is a flowchart of a second example method for operating an automated checkout system, in accordance with various aspects of the present disclosure.

Referring to FIG. 8, in operation, the retail management system 602 may perform a method 800 of operating an automated checkout system. The method 800 may be performed by the RMS 602 (which may include the memory 608 and which may be the entire RMS 602 and/or one or more components of the RMS 602, such as processing circuit 606, processor 607, and/or memory 608). The method 800 may be performed by the RMS 602 in communication with the user device 504, the container 506, and the building sensors 630.

At block 802, the method 800 includes determining, by a processing circuit, a user account associated with a shopper. For example, in an aspect, the RMS 602, the processing circuit 606, processor 607, the memory 608, the user data collector component 610, and/or the account identifier component 612 may be configured to or may comprise means for determining, by the processing circuit 606, the user account associated with the shopper 502.

For example, the determining at block 802 may include analyzing data that the RMS 602 receives from the exit sensor 512 located at the entrance and/or exit of the retail environment 500. The data may include data obtained from the user device 504 of the shopper 502. In some aspects, the determining at block 802 may further include receiving user device data that individually identifies the user device 504 and/or an account of the user device 504. For example, the receiving may include receiving a signal, such as a Bluetooth signal, that includes a device identifier and/or receiving data obtained from a scan of a barcode displayed at the user interface (e.g., application 642) of the user device 504. The RMS 602 may identify the received data and compare the received data with user account data stored in the account database 622. That is, the RMS 602 may identify a user account that is associated with the matching data and determine the user account based on the matching data. For example, in some aspects, the RMS 602 may identify a user account from the account database 622 without identifying the identity of the shopper 502.

In other optional or additional aspects, the RMS 602 may receive picture and/or video data of the shopper 502 entering and/or exiting the retail environment 500. The RMS 602 may use object recognition techniques on the picture and/or video data to identify the shopper 502 appearing in the picture and/or video data. For example, the RMS 602 may identify the shopper 502 based on a picture of the shopper 502 that the shopper 502 uploaded to the RMS 602 via the application 642 on their user device 504. Based on the identified identity, the RMS 602 may determine the user account of the shopper 502 that entered and/or exited the retail environment 500.

In other optional or additional aspects, the determining at block 802 may further include identifying the shopper 502 based on biometric information. For example, the exit sensor 512 may include a biometric sensor and the RMS 602 may utilize facial recognition technology to identify the shopper 502 entering and/or exiting the retail environment 500. In such an aspect, the biometric sensor may generate facial feature biometric data such as nodal points (e.g., end points on the face of a shopper 502) to identify the shopper 502. The biometric sensor and/or the RMS 602 may identify the shopper 502 based on the biometric data and the RMS 602 may identify a user account associated with the shopper 502 based on the identity.

Further, for example, the determining at block 802 may be performed to identify the user account of the shopper 502 that is entering and/or exiting the retail environment 500. Such an identification may allow the RMS 602 to automatically associate purchases made by the shopper 502 to the user account of the shopper 502.

At block 804, the method 800 includes associating, by the processing circuit, the user account with a container. For example, in an aspect, the RMS 602, the processing circuit 606, processor 607, the memory 608, the user data collector component 610, the account identifier component 612, and/or the container data collector component 626 may be configured to or may comprise means for associating, by the processing circuit 606, the user account with the container 506.

For example, the associating at block 804 may include the shopper 502 associated with the user account inputting the container number and/or container type into the user device 504 (e.g., through the application 642 of the user device 504) to indicate that the shopper 502 is using the container 506 to shop in the retail environment 500. In some aspects, the shopper 502 may associate the container 506 with their user account by scanning a tag coupled with the container 506 into the exit sensor 512. The exit sensor 512 may provide data obtained from the scan to the container data collector component 626. The container data collector component 626 may receive the scanned container data and associate the container with the user account. The container data collector component 626 may associate the container 506 with the user account based on obtaining the data within a threshold amount of time or based on a user input indicating for the container 506 and user account to be associated.

Further, for example, the associating at block 804 may be performed to identify the container 506 that is in use by the shopper 502 while shopping at the retail environment 500. Such an identification may allow the RMS 602 to automatically associate the objects carried by the container 506 with the shopper 502 and assign the purchase of the objects to the shopper 502 upon the shopper 502 exiting the retail environment 500.

At block 806, the method 800 includes receiving, by the processing circuit from a sensor, a first indication that an object passed through a location of a building, the first indication having been generated based on a tag coupled with the object, the sensor having been configured to detect characteristics of objects and being located at the location of the building. For example, in an aspect, the RMS 602, the processing circuit 606, processor 607, the memory 608, the object data collector component 614, and/or the object identifier component 616 may be configured to or may comprise means for receiving, by the processing circuit 606 from the sensor 512, the first indication that an object passed through the location 510 of the building 500, the first indication having been generated based on a tag coupled with the object, the sensor 512 having been configured to detect characteristics of objects and being located at the location 510 of the building 500.

For example, the receiving at block 806 may include the exit sensor 512 transmitting identification information of the tag 520 to the object data collector component 614 to indicate that the object has entered the field of view of the exit sensor 512 (e.g., the object is exiting and/or is being removed from the retail environment 500). The object data collector component 614 may receive the tag data (e.g., identification information) and identify which object is exiting the store from the tag data (e.g., by comparing the tag data to the object database 624 and identifying an object with matching tag data).

In other optional or additional aspects, the first indication may include identification of the object to which the tag is coupled. Alternatively or additionally, the first indication may include a timestamp indicating when the first indication was generated. In some aspects, the object data collector component 614 may generate a timestamp to identify the time that the object data collector component 614 received the first indication.

Further, for example, the receiving at block 806 may be performed to identify an object that has exited or is exiting the retail environment 500. Such an identification may allow the RMS 602 to automatically associate the object with a shopper 502 and assign the purchase of the object to the shopper 502.

At block 808, the method 800 includes receiving, by the processing circuit from the sensor, a second indication that the container passed through the location of the building. For example, in an aspect, the RMS 602, the processing circuit 606, processor 607, the memory 608, and/or the container data collector component 626 may be configured to or may comprise means for receiving, by the processing circuit 606 from the sensor 512, a second indication that the container 506 passed through the location 510 of the building 500.

For example, the receiving at block 808 may include receiving the second indication that the container 506 passed through the location 510 (e.g., exit area) of the retail environment 500 based on data that the RMS 602 received from the exit sensor 512 detecting that the tag coupled with the container 506 as the container 506 exits the retail environment 500. The exit sensor 512 may detect the tag coupled with the container 506 in a similar manner to how the tag coupled with the object is detected (e.g., using RFID scans, magnetic scans, object identification). The second indication may include identification of the container 506 to which the tag is coupled. Alternatively or additionally, the second indication may include a timestamp indicating when the second indication was generated. In some aspects, the container data collector component 626 may generate a timestamp to identify the time at which the container data collector component 626 received the second indication.

Further, for example, the receiving at block 808 may be performed to identify the container 506 that has exited or is exiting the retail environment 500. Such an identification may allow the RMS 602 to automatically assign object purchases to the shopper 502.

At block 810, the method 800 includes associating, by the processing circuit, the object with the user account based on the first indication and the second indication. For example, in an aspect, the RMS 602, the processing circuit 606, processor 607, the memory 608, and/or the object associating component 618 may be configured to or may comprise means for associating, by the processing circuit 606, the object with the user account based on the first indication and the second indication.

For example, the associating at block 810 may include associating the object with the user account by identifying the object from the first indication and the user account that is associated with the container 506 of the second indication. Based on identifying the object and the user account, the RMS 602 may associate the object with the user account. For example, the object associating component 618 may determine that an object is exiting the retail environment 500 based on a reading of a tag coupled with the object. Alternatively or additionally, the object associating component 618 may determine that the container 506 is exiting the retail environment 500 based on a reading of another tag coupled with the container 506. The object associating component 618 may identify the user account that is associated with the container 506 and associate the object with the user account.

In some optional or additional aspects, the object associating component 618 may associate the object with the user account based on the timestamps associated with the first indication and the second indication being within a threshold of each other. The threshold may be determined by an administrator. If or when the timestamps are within the threshold of each other, the object associating component 618 may associate the object with the user account. Alternatively or additionally, the object associating component 618 may generate a signal indicating that there was an error and/or an alert indicating that the shopper 502 is trying to exit the retail environment 500 with an object without paying for the object. In some aspects, the alert may comprise an audible alarm in the retail environment 500 to alert security personnel that an object that is not authorized to be removed from the retail environment 500 (e.g., not purchased) is exiting the retail environment 500.

Further, for example, the associating at block 810 may be performed to associate the objects carried out of the retail environment 500 by the shopper 502. Advantageously, the RMS 602 may automatically associate purchases made by the shopper 502 as they exit the retail environment 500.

Figure 9:
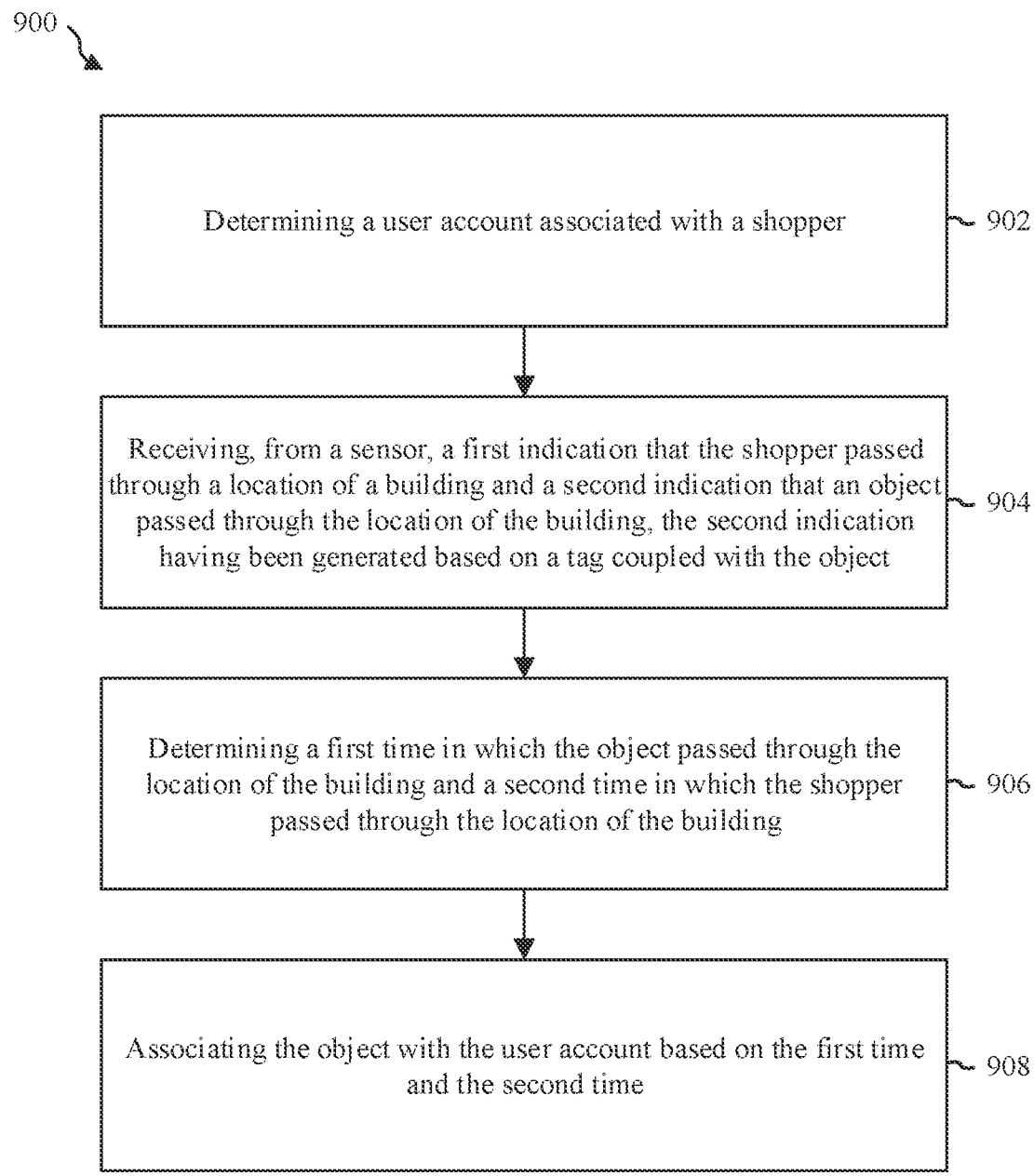
FIG. 9 is a flowchart of a third example method for operating an automated checkout system, in accordance with various aspects of the present disclosure.

Referring to FIG. 9, in operation, the retail management system 602 may perform a method 900 of operating an automated checkout system. The method 900 may be performed by the RMS 602 (which may include the memory 608 and which may be the entire RMS 602 and/or one or more components of the RMS 602, such as processing circuit 606, processor 607, and/or memory 608). The method 900 may be performed by the RMS 602 in communication with the user device 504, the container 506, and the building sensors 630.

At block 902, the method 900 includes determining a user account associated with a shopper. For example, in an aspect, the RMS 602, the processing circuit 606, processor 607, the memory 608, the user data collector component 610, and/or the account identifier component 612 may be configured to or may comprise means for determining the user account associated with the shopper 502.

For example, the determining at block 902 may include analyzing data that the RMS 602 receives from the exit sensor 512 located at the entrance and/or exit of the retail environment 500. The data may include data obtained from the user device 504 of the shopper 502. In some aspects, the determining at block 902 may further include receiving user device data that individually identifies the user device 504 and/or an account of the user device 504. For example, the receiving may include receiving a signal, such as a Bluetooth signal, that includes a device identifier and/or receiving data obtained from a scan of a barcode displayed at the user interface (e.g., application 642) of the user device 504. The RMS 602 may identify the received data and compare the received data with user account data stored in the account database 622. That is, the RMS 602 may identify a user account that is associated with the matching data and determine the user account based on the matching data. For example, in some aspects, the RMS 602 may identify a user account from the account database 622 without identifying the identity of the shopper 502.

In other optional or additional aspects, the RMS 602 may receive picture and/or video data of the shopper 502 entering and/or exiting the retail environment 500. The RMS 602 may use object recognition techniques on the picture and/or video data to identify the shopper 502 appearing in the picture and/or video data. For example, the RMS 602 may identify the shopper 502 based on a picture of the shopper 502 that the shopper 502 uploaded to the RMS 602 via the application 642 on their user device 504. Based on the identified identity, the RMS 602 may determine the user account of the shopper 502 that entered and/or exited the retail environment 500.

In other optional or additional aspects, the determining at block 902 may further include identifying the shopper 502 based on biometric information. For example, the exit sensor 512 may include a biometric sensor and the RMS 602 may utilize facial recognition technology to identify the shopper 502 entering and/or exiting the retail environment 500. In such an aspect, the biometric sensor may generate facial feature biometric data such as nodal points (e.g., end points on the face of a shopper 502) to identify the shopper 502. The biometric sensor and/or the RMS 602 may identify the shopper 502 based on the biometric data and the RMS 602 may identify a user account associated with the shopper 502 based on the identity.

Further, for example, the determining at block 902 may be performed to identify the user account of the shopper 502 that is entering and/or exiting the retail environment 500. Such an identification may allow the RMS 602 to automatically associate purchases made by the shopper 502 to the user account of the shopper 502.

At block 904, the method 900 includes receiving, from a sensor, a first indication that the shopper passed through a location of a building and a second indication that an object passed through the location of the building, the second indication having been generated based on a tag coupled with the object. For example, in an aspect, the RMS 602, the processing circuit 606, processor 607, the memory 608, the object data collector component 614, the object identifier component 616, the user data collector component 610, and/or the account identifier component 612 may be configured to or may comprise means for receiving, from the sensor 512, the first indication that the shopper 502 passed through the location 510 of the building 500 and the second indication that the object passed through the location 510 of the building 500, the second indication having been generated based on the tag coupled with the object.

For example, the receiving at block 904 may include the exit sensor 512 transmitting identification information of the tag 520 to the object data collector component 614 to indicate that the object has entered the field of view of the exit sensor 512 (e.g., the object is exiting and/or is being removed from the retail environment 500). The object data collector component 614 may receive the tag data (e.g., identification information) and identify which object is exiting the store from the tag data (e.g., by comparing the tag data to the object database 624 and identifying an object with matching tag data).

In other optional or additional aspects, the first indication may include identification of the object to which the tag is coupled. Alternatively or additionally, the first indication may include a timestamp indicating when the first indication was generated. In some aspects, the object data collector component 614 may generate a timestamp to identify the time that the object data collector component 614 received the first indication.

In other optional or additional aspects, the receiving at block 904 may include tracking the shopper 502 as the shopper 502 moves around the retail environment 500 and receiving the second indication when the shopper 502 exits the retail environment 500. The second indication that the shopper 502 associated with the user account passed through the location (e.g., exit area 510) may include similar data to the data that is used to determine the user account of the shopper 502 (e.g., visual data, device data, and/or account identification data). In some aspects, the second indication may be light reflection data indicating that the shopper 502 crossed a boundary of the retail environment 500.

In other optional or additional aspects, the receiving at block 904 may be performed similarly to or in conjunction with block 902 as described above. For example, the receiving of the second indication may be the same indication that the RMS 602 used to determine the user account associated with the shopper 502 as described in block 902. That is, the RMS 602 may determine the user account associated with the shopper 502 when the shopper 502 exits the retail environment 500.

Further, for example, the receiving at block 904 may be performed to identify an object and the shopper 502 that have exited or are exiting the retail environment 500. Such identifications may allow the RMS 602 to automatically associate the object with a shopper 502 and assign the purchase of the object to the shopper 502.

At block 906, the method 900 includes determining a first time in which the object passed through the location of the building and a second time in which the shopper passed through the location of the building. For example, in an aspect, the RMS 602, the processing circuit 606, processor 607, the memory 608, the object data collector component 614, the object identifier component 616, the user data collector component 610, and/or the account identifier component 612 may be configured to or may comprise means for determining the first time in which the object passed through the location 510 of the building 500 and the second time in which the shopper 502 passed through the location 510 of the building 500.

For example, the determining at block 906 may include determining the first time in which the object passed through the location 510 (e.g., exit area) of the retail environment 500 based on a first timestamp that is associated with the second indication that the object passed through the location 510 of the retail environment 500. The determining at block 906 may further include determining the second time in which the shopper 502 passed through the location 510 of the retail environment 500 based on a second timestamp that is associated with the first indication that the 502 passed through the location 510 of the retail environment 500. Each timestamp may be associated with times in which the indications were generated by the exit sensor 512 at the location 510 and/or times in which the RMS 602 received the indications.

Further, for example, the determining at block 906 may be performed to determine the times at which the object and the shopper 502 have been detected exiting the retail environment 500. Such a determination may allow the RMS 602 to associate the object with the shopper 502 and to use the association to assign the purchase of the object to the shopper 502.

At block 908, the method 900 includes associating the object with the user account based on the first time and the second time. For example, in an aspect, the RMS 602, the processing circuit 606, processor 607, the memory 608, the object associating component 618, and/or the list generator component 620 may be configured to or may comprise means for associating the object with the user account based on the first time and the second time.

For example, the associating at block 908 may include determining the difference between the first time and second time by subtracting the first time from the second time. The object associating component 618 may determine a difference between the first time that the object exited the retail environment 500 and the second time that the shopper 502 exited the retail environment 500. The object associating component 618 may compare the difference to a threshold, which may have been determined by an administrator of the RMS 602. If or when the difference is less than the threshold, the object associating component 618 may associate the object with the user account of the shopper 502.

Alternatively or additionally, if or when the difference is greater than the threshold, the object associating component 618 may generate an alert indicating the object could not be associated with any user accounts. In some aspects, the alert may comprise an audible alarm in the retail environment 500 to alert security personnel that an object that is not authorized to be removed from the retail environment 500 (e.g., not purchased) is exiting the retail environment 500.

Further, for example, the associating at block 908 may be performed to associate the objects carried out of the retail environment 500 by the shopper 502. Advantageously, the RMS 602 may automatically associate purchases made by the shopper 502 as they exit the retail environment 500.

Figure 10:
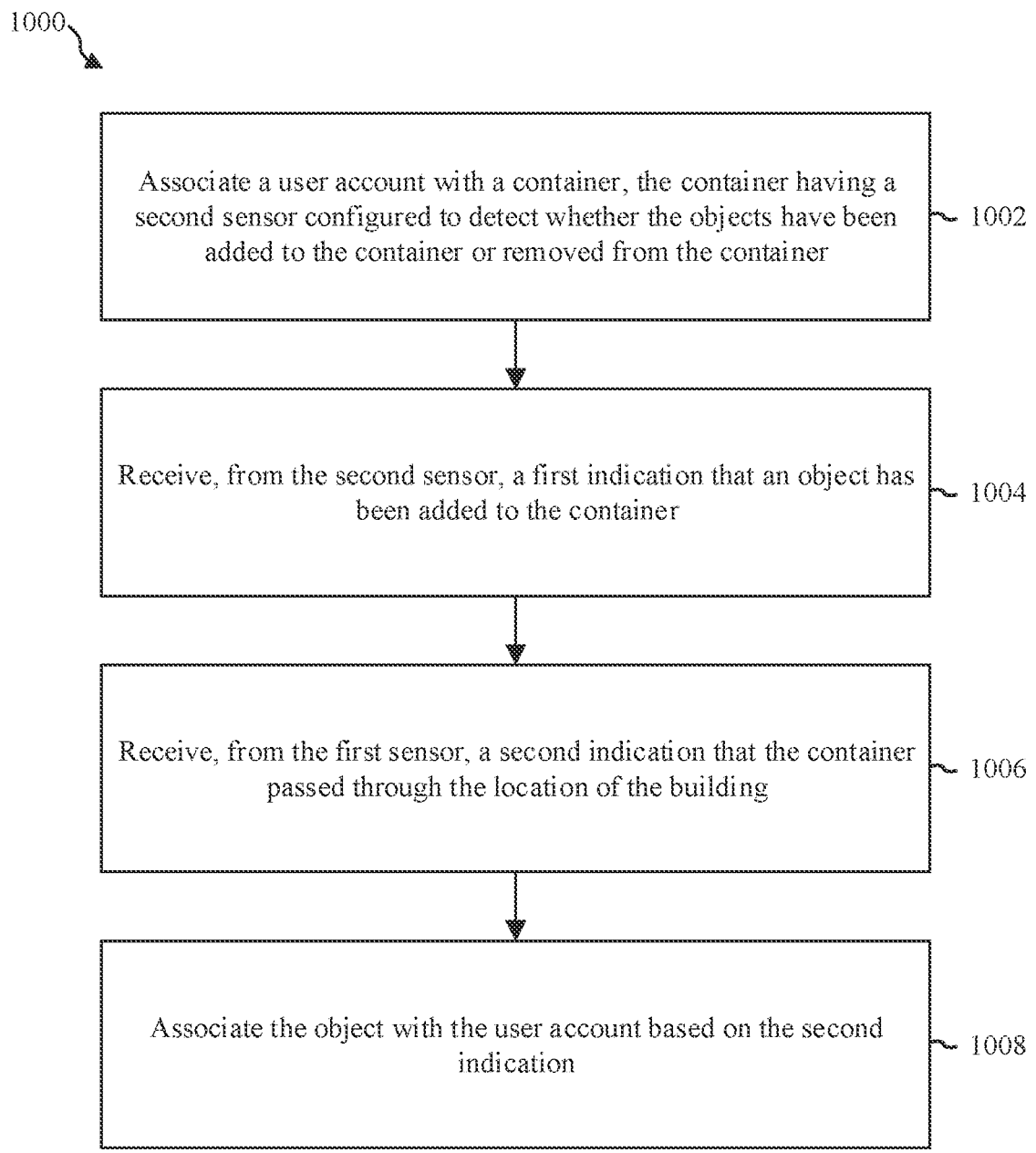
FIG. 10 is a flowchart of a fourth example method for operating an automated checkout system, in accordance with various aspects of the present disclosure.

Referring to FIG. 10, in operation, the retail management system 602 may perform a method 1000 of operating an automated checkout system. The method 1000 may be performed by the RMS 602 (which may include the memory 608 and which may be the entire RMS 602 and/or one or more components of the RMS 602, such as processing circuit 606, processor 607, and/or memory 608). The method 1000 may be performed by the RMS 602 in communication with the user device 504, the container 506, and the building sensors 630.

At block 1002, the method 1000 includes to associate a user account with a container, the container having a second sensor configured to detect whether the objects have been added to the container or removed from the container. For example, in an aspect, the RMS 602, the processing circuit 606, processor 607, the memory 608, and/or the object associating component 618 may be configured to or may comprise means to associate the user account with the container 506, the container 506 having the second sensor 508 configured to detect whether the objects have been added to the container 506 or removed from the container 506.

For example, the associating at block 1002 may include the shopper 502 associated with the user account inputting the container number and/or container type into the user device 504 (e.g., through the application 642 of the user device 504) to indicate that the shopper 502 is using the container 506 to shop in the retail environment 500. In some aspects, the shopper 502 may associate the container 506 with their user account by scanning a tag coupled with the container 506 into the exit sensor 512. The exit sensor 512 may provide data obtained from the scan to the container data collector component 626. The container data collector component 626 may receive the scanned container data and associate the container with the user account. The container data collector component 626 may associate the container 506 with the user account based on obtaining the data within a threshold amount of time or based on a user input indicating for the container 506 and user account to be associated.

Further, for example, the associating at block 1002 may be performed to identify the container 506 that is in use by the shopper 502 while shopping at the retail environment 500. Such an identification may allow the RMS 602 to automatically associate the objects carried by the container 506 with the shopper 502 and assign the purchase of the objects to the shopper 502 upon the shopper 502 exiting the retail environment 500.

At block 1004, the method 1000 includes to receive, from the second sensor, a first indication that an object has been added to the container. For example, in an aspect, the RMS 602, the processing circuit 606, processor 607, the memory 608, and/or the container data collector component 626 may be configured to or may comprise means to receive, from the second sensor 508, a first indication that an object has been added to the container 506.

For example, the receiving at block 1004 may include receiving object data from the container sensor 508 indicating which objects have been added to the container 506. In some aspects, the container sensor 508 may transmit the object data as the objects are added to the container 506. Alternatively or additionally, the object data may comprise characteristics of the objects and/or tags coupled with the objects. For example, the object data may comprise object type, object identification number, values associated with the object, and the like.

In other optional or additional aspects, the shopper 502 may hold a sensor similar to the container sensor 508 as the shopper 502 walks around the retail environment 500. The sensor may have been previously associated with a user account of the shopper 502. The shopper 502 may pick up an object that the shopper 502 desires to purchase and scan the object causing object data of the scanned object to be received.

Further, for example, the receiving at block 1004 may be performed to identify the objects in the container 506 that is in use by the shopper 502 while shopping at the retail environment 500. Such an identification may allow the RMS 602 to automatically associate the objects carried by the container 506 with the shopper 502 and assign the purchase of the objects to the shopper 502 upon the shopper 502 exiting the retail environment 500.

At block 1006, the method 1000 includes to receive, from the first sensor, a second indication that the container passed through the location of the building. For example, in an aspect, the RMS 602, the processing circuit 606, processor 607, the memory 608, and/or the container data collector component 626 may be configured to or may comprise means to receive, from the first sensor 512, a second indication that the container 506 passed through the location 510 of the building 500.

For example, the receiving at block 1006 may include tracking the shopper 502 as the shopper 502 moves around the retail environment 500 and receiving the second indication when the shopper 502 exits the retail environment 500. The second indication that the shopper 502 associated with the user account passed through the location (e.g., exit area 510) may include similar data to the data that is used to determine the user account of the shopper 502 (e.g., visual data, device data, and/or account identification data). In some aspects, the second indication may be light reflection data indicating that the shopper 502 crossed a boundary of the retail environment 500.

In other optional or additional aspects, the receiving at block 1006 may be performed similarly to or in conjunction with block 1002 as described above. For example, the receiving of the second indication may be the same indication that the RMS 602 used to determine the container 506 associated with the shopper 502 as described in block 1002. That is, the RMS 602 may determine the container 506 with the shopper 502 when the shopper 502 exits the retail environment 500.

Further, for example, the receiving at block 1006 may be performed to identify the shopper 502 that has exited or is exiting the retail environment 500. Such an identification may allow the RMS 602 to automatically assign object purchases to the shopper 502.

At block 1008, the method 1000 includes to associate the object with the user account based on the second indication. For example, in an aspect, the RMS 602, the processing circuit 606, processor 607, the memory 608, and/or the object associating component 618 may be configured to or may comprise means to associate the object with the user account based on the second indication.

For example, the associating at block 1008 may include generating a virtual shopping cart as the container sensor 508 detects objects that are added to the container 506. The virtual shopping cart may include identifications of the objects that the container sensor 508 has detected as being added to the container 506 along with values associated with the objects. As the shopper 502 adds and/or removes objects from the container 506, the list generator component 620 may add and/or remove corresponding object identifications from the virtual shopping cart, respectively Further, for example, the associating at block 1008 may be performed to identify the objects in the container 506 that is in use by the shopper 502 while shopping at the retail environment 500. Such an identification may allow the RMS 602 to automatically associate the objects carried by the container 506 with the shopper 502 and assign the purchase of the objects to the shopper 502 upon the shopper 502 exiting the retail environment 500.

Figure 11:
FIG. 11 is a diagram of an example of an user interface, in accordance with various aspects of the present disclosure.

Referring now to FIG. 11, an example of an user interface 1100 of a shopping list that illustrates objects that have been added to a shopper 502 or container 506 while the shopper 502 or container 506 travels through retail environment 500 of FIG. 5 is shown, according to an exemplary aspect. The shopping list of user interface 1100 may include various objects that a shopper 502 may have purchased while shopping in the retail environment 500. In some aspects, the shopping list may include multiple items and values associated with the items. The shopping list may be a list that indicates items that the shopper 502 purchased by walking out of the retail environment 500. The shopping list may be a dynamic virtual shopping list to which objects may be added and/or removed as the shopper 502 adds and/or removes objects from their container 506 and/or from their hands. The shopping list may also include an aggregated total that illustrates a total or aggregated value of the objects that were purchased or that are currently in the virtual shopping cart. A user (e.g., shopper 502) may view user interfaces similar to the user interface 1100 through an application (e.g., application 642) on their corresponding user device 504. The application 642 may be configured to track purchases that the shopper 502 has made at the retail environment 500 and provide a user interface for a user (e.g., shopper 502) to use to scan into the RMS 602 (e.g., via a barcode). The user may also view receipts and their purchase history at the retail environment 500 via the application 642. In some aspects, the application 642 may be associated with more than one retail environment 500, and, as such, the shopper 502 may view their shopping activity at multiple retail environments 500.

Advantageously, by leveraging the sensors that may already be present at the entrance or exit at the retail environment 500 and tags that are coupled with objects, the system and methods provided herein may enable a shopping solution that allows the shoppers 502 to purchase objects in the retail environment 500 without interaction with a cash register. Such interactions may result in long wait times before the shoppers 502 may exit the retail environment 500, thereby reducing customer satisfaction of the purchasing experience. The systems and methods described herein may provide for a retail management system to identify and associate the shoppers 502 entering and/or exiting the retail environment 500 with their corresponding user accounts and/or the objects purchased by the shoppers 502 during their visit to the retail environment 500. Based on the identifications and a variety of characteristics of each of the same, the user accounts of the shoppers 502 may be associated with the objects that the shoppers wish to purchase. The data may be obtained from security sensors that were previously implemented to determine if the shoppers 502 exited the retail store with an object that was still coupled with a security tag. Accordingly, the systems and methods described herein may be used in a new retail system to utilize an existing infrastructure of security sensors that enables customers to purchase objects without waiting in long lines. Customers may instead walk into retail stores, pick up the objects they wish to purchase, and walk out with the objects to make such purchases.

The construction and arrangement of the systems and methods as shown in the various exemplary aspects are illustrative only. Although only a few aspects have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative aspects. Other substitutions, modifications, changes, and omissions may be made in the design, operating conditions and arrangement of the exemplary aspects without departing from the scope of the present disclosure.

The present disclosure contemplates methods, systems and program products on any machine-readable media for accomplishing various operations. The aspects of the present disclosure may be implemented using existing computer processors, or by a special purpose computer processor for an appropriate system, incorporated for this or another purpose, or by a hardwired system. Aspects within the scope of the present disclosure include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

Implementation examples are described in the following numbered clauses:

1. An automated checkout system, comprising:
    a sensor configured to detect characteristics of objects, the sensor being located at a location of a building;
    one or more processors; and
    one or more non-transitory memory devices storing computer-readable instructions that, when executed by the one or more processors, cause the one or more processors to:
        determine a user account associated with a shopper;
        receive, from the sensor, a first indication that an object passed through the location, the first indication having been generated based on a tag coupled with the object;
        receive, from the sensor, a second indication that the shopper associated with the user account passed through the location; and
        associate the object with the user account based on the first indication and the second indication.

2. The automated checkout system of clause 1, wherein to associate the object with the user account comprises further computer-readable instructions to:
    determine a first time in which the object passed through the location;
    determine a second time in which the shopper associated with the user account passed through the location;
    compare the first time to the second time to determine whether the object passed through the location and the shopper passed through the location within a time period of each other; and
    associate the object with the user account based on determining that the object and the shopper passed through the location within the time period of each other.

3. The automated checkout system of clauses 1 or 2, wherein to determine the user account associated with the shopper comprises further computer-readable instructions to:
    receive visual data of the shopper entering the building;
    identify facial features of the shopper from the visual data;
    compare the facial features of the shopper to a database; and
    identify the user account based on comparing the facial features of the shopper to the database.

4. The automated checkout system of clauses 1-3, wherein to determine the user account associated with the shopper comprises further computer-readable instructions to:
    determine the user account associated with the shopper without identifying an identity of the shopper.

5. The automated checkout system of any of the clauses 1-4,
    wherein the user account is associated with a client device; and
    wherein determine the user account associated with the shopper comprises further computer-readable instructions to:
        receive, from the sensor, data identifying the client device;
        compare the data to a database; and
        identify the user account based on comparing the data to the database.

6. The automated checkout system of any of the clauses 1-5, wherein to receive the second indication comprises further computer-readable instructions to:
    receive, from the sensor, first signals identifying the tag;
    compare the first signals to a database; and
    identify the object based on comparing the first signals to the database.

7. The automated checkout system of clause 6, wherein to associate the object with the user account comprises further computer-readable instructions to:
    receive, from the sensor, second signals comprising a third indication that a second shopper associated with a second user account passed through the location of the building;
    determine a first signal strength of the first signals identifying the tag;
    determine a second signal strength of the second signals comprising the third indication; and
    associate the object with the user account based further on the first signal strength of the first signals identifying the tag and the second signal strength of the second signals comprising the third indication.

8. The automated checkout system of any of the clauses 1-7, wherein the tag is one of a radio frequency identification ("RFID") tag, a picture, and a Bluetooth tracking tag.

9. The automated checkout system of any of the clauses 1-8,
    wherein the user account is associated with a container; and
    wherein to receive the second indication comprises further computer-readable instructions to:
        receive an indication that the container passed through the location of the building.

10. The automated checkout system of clause 9, wherein the container is one of a cart, a bag, a box, and a basket.

11. The automated checkout system of any of the clauses 1-10, wherein the characteristics of the objects comprise at least one of movement and a present location of the objects.

12. The automated checkout system of any of the clauses 1-11, wherein the sensor is configured to cause an alert that the shopper is exiting with an unpaid item to go off.

13. A method of operating an automated checkout system, comprising:

determining, by a processing circuit, a user account associated with a shopper;

associating, by the processing circuit, the user account with a container;

receiving, by the processing circuit from a sensor, a first indication that an object passed through a location of a building, the first indication having been generated based on a tag coupled with the object, the sensor having been configured to detect characteristics of objects and being located at the location of the building;

receiving, by the processing circuit from the sensor, a second indication that the container passed through the location of the building; and associating, by the processing circuit, the object with the user account based on the first indication and the second indication.

14. The method of clause 13, wherein associating the object with the user account comprises:

determining a first time in which the object passed through the location;

determining a second time in which the container passed through the location;

comparing the first time to the second time to determine whether the object and the container passed through the location within a time period of each other; and associating the object with the user account based on determining that the object passed through the location and that the container passed through the location within the time period of each other.

15. The method of clauses 13 or 14, wherein determining the user account associated with the shopper comprises:

determining the user account associated with the shopper without identifying an identity of the shopper.

16. The method of any of the clauses 13-15, wherein the user account is associated with a client device; and wherein determining the user account associated with the shopper comprises:

receiving, from the sensor, data identifying the client device;

comparing the data to a database; and identifying the user account based on comparing the data to the database.

17. The method of any of the clauses 13-16, wherein receiving the first indication comprises:

receiving, from the sensor, first signals identifying the tag;

comparing the first signals to a database; and identifying the object based on comparing the first signals to the database.

18. The method of any of the clauses 13-17, wherein the tag is at least one of a radio frequency identification ("RFID") tag, a picture, and a Bluetooth tracking tag.

19. A non-transitory computer-readable medium having computer-readable instructions stored thereon that, upon execution by a processor, cause the processor to perform operations comprising:

determining a user account associated with a shopper;

receiving, from a sensor, a first indication that the shopper passed through a location of a building and a second indication that an object passed through the location of the building, the second indication having been generated based on a tag coupled with the object;

determining a first time in which the object passed through the location of the building and a second time in which the shopper passed through the location of the building; and associating the object with the user account based on the first time and the second time.

20. The non-transitory computer-readable medium of clause 19, wherein determining the user account associated with the shopper comprises:

determining the user account associated with the shopper without identifying an identity of the shopper.

21. The non-transitory computer-readable medium of clauses 19 or 20, wherein associating the object with the user account comprises:

determining a difference between the first time and the second time; and associating the object with the user account based on the difference between the first time and the second time.

22. The non-transitory computer-readable medium of any of the clauses 19-23, wherein receiving the second indication comprises:

receiving, from the sensor, first signals identifying the tag;

comparing the first signals to a database; and identifying the object based on comparing the first signals to the database.

23. The non-transitory computer-readable medium of clause 22, wherein associating the object with the user account comprises:

receiving, from the sensor, second signals comprising a third indication that a second shopper associated with a second user account passed through the location of the building;

determining a first signal strength of the first signals and a second signal strength of the second signals; and associating the object with the user account based further on the first signal strength and the second signal strength.

24. An automated checkout system comprising:

a first sensor configured to detect characteristics of objects, the first sensor being located at a location of a building;

one or more processors; and one or more non-transitory memory devices storing computer-readable instructions that, when executed by the one or more processors, cause the one or more processors to:

associate a user account with a container, the container having a second sensor configured to detect whether the objects have been added to the container or removed from the container;

receive, from the second sensor, a first indication that an object has been added to the container;

receive, from the first sensor, a second indication that the container passed through the location of the building; and associate the object with the user account based on the second indication.

25. The automated checkout system of clause 24, wherein the object is a first object; and wherein the computer-readable instructions further cause the one or more processors to:

receive, from the second sensor, a third indication that a second object has been added to the container;

associate the first object and the second object with a list of objects;

receive, from the second sensor, a fourth indication that the second object was removed from the container; and disassociate the second object from the list of objects responsive to receiving the fourth indication, wherein to associate the first object with the user account comprises to associate a portion of the list of objects with the user account based on the second indication.

26. The automated checkout system of any of the clauses 24-25, wherein the container is one of a cart, a bag, a box, and a basket.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An automated checkout system, comprising:
a sensor configured to detect characteristics of objects, the sensor being located at a location of a building;
one or more processors; and
one or more non-transitory memory devices storing computer-readable instructions that, when executed by the one or more processors, cause the one or more processors to:
determine a user account associated with a shopper;
receive, from the sensor, a first indication that an object passed through the location, the first indication having been generated based on a tag coupled with the object;
receive, from the sensor, a second indication that the shopper associated with the user account passed through the location; and
associate the object with the user account based on the first indication and the second indication.

2. The automated checkout system of claim 1, wherein to associate the object with the user account comprises further computer-readable instructions to:
determine a first time in which the object passed through the location;
determine a second time in which the shopper associated with the user account passed through the location;
compare the first time to the second time to determine whether the object passed through the location and the shopper passed through the location within a time period of each other; and
associate the object with the user account based on determining that the object and the shopper passed through the location within the time period of each other.

3. The automated checkout system of claim 1, wherein to determine the user account associated with the shopper comprises further computer-readable instructions to:
receive visual data of the shopper entering the building;
identify facial features of the shopper from the visual data;
compare the facial features of the shopper to a database; and
identify the user account based on comparing the facial features of the shopper to the database.

4. The automated checkout system of claim 1, wherein to determine the user account associated with the shopper comprises further computer-readable instructions to:
determine the user account associated with the shopper without identifying an identity of the shopper.

5. The automated checkout system of claim 1,
wherein the user account is associated with a client device; and
wherein to determine the user account associated with the shopper comprises further computer-readable instructions to:
receive, from the sensor, data identifying the client device;
compare the data to a database; and
identify the user account based on comparing the data to the database.

6. The automated checkout system of claim 1, wherein to receive the second indication comprises further computer-readable instructions to:
receive, from the sensor, first signals identifying the tag;
compare the first signals to a database; and
identify the object based on comparing the first signals to the database.

7. The automated checkout system of claim 6, wherein to associate the object with the user account comprises further computer-readable instructions to:
receive, from the sensor, second signals comprising a third indication that a second shopper associated with a second user account passed through the location of the building;
determine a first signal strength of the first signals identifying the tag;
determine a second signal strength of the second signals comprising the third indication; and
associate the object with the user account based further on the first signal strength of the first signals identifying the tag and the second signal strength of the second signals comprising the third indication.

8. The automated checkout system of claim 1, wherein the tag is one of a radio frequency identification ("RFID") tag, a picture, and a Bluetooth tracking tag.

9. The automated checkout system of claim 1,
wherein the user account is associated with a container; and
wherein to receive the second indication comprises further computer-readable instructions to:
receive an indication that the container passed through the location of the building.

10. The automated checkout system of claim 9, wherein the container is one of a cart, a bag, a box, and a basket.

11. The automated checkout system of claim 1, wherein the characteristics of the objects comprise at least one of movement and a present location of the objects.

12. The automated checkout system of claim 1, wherein the sensor is configured to cause an alert that the shopper is exiting with an unpaid item to go off.

13. A method of operating an automated checkout system, comprising:
determining, by a processing circuit, a user account associated with a shopper;
associating, by the processing circuit, the user account with a container;
receiving, by the processing circuit from a sensor, a first indication that an object passed through a location of a building, the first indication having been generated based on a tag coupled with the object, the sensor having been configured to detect characteristics of objects and being located at the location of the building;
receiving, by the processing circuit from the sensor, a second indication that the container passed through the location of the building; and
associating, by the processing circuit, the object with the user account based on the first indication and the second indication.

14. The method of claim 13, wherein associating the object with the user account comprises:
determining a first time in which the object passed through the location;
determining a second time in which the container passed through the location;
comparing the first time to the second time to determine whether the object and the container passed through the location within a time period of each other; and
associating the object with the user account based on determining that the object passed through the location and that the container passed through the location within the time period of each other.

15. The method of claim 13, wherein determining the user account associated with the shopper comprises:
determining the user account associated with the shopper without identifying an identity of the shopper.

16. The method of claim 13,
wherein the user account is associated with a client device; and
wherein determining the user account associated with the shopper comprises:
receiving, from the sensor, data identifying the client device;
comparing the data to a database; and
identifying the user account based on comparing the data to the database.

17. The method of claim 13, wherein receiving the first indication comprises:
receiving, from the sensor, first signals identifying the tag;
comparing the first signals to a database; and
identifying the object based on comparing the first signals to the database.

18. The method of claim 13, wherein the tag is at least one of a radio frequency identification ("RFID") tag, a picture, and a Bluetooth tracking tag.

19. A non-transitory computer-readable medium having computer-readable instructions stored thereon that, upon execution by a processor, cause the processor to perform operations comprising:
determining a user account associated with a shopper;
receiving, from a sensor, a first indication that the shopper passed through a location of a building and a second indication that an object passed through the location of the building, the second indication having been generated based on a tag coupled with the object;
determining a first time in which the object passed through the location of the building and a second time in which the shopper passed through the location of the building; and
associating the object with the user account based on the first time and the second time.

20. The non-transitory computer-readable medium of claim 19, wherein determining the user account associated with the shopper comprises:
determining the user account associated with the shopper without identifying an identity of the shopper.

* * * * *